United States Patent
Oneda et al.

(10) Patent No.: US 7,386,176 B2
(45) Date of Patent: Jun. 10, 2008

(54) IMAGE SENDING APPARATUS AND IMAGE RECEIVING APPARATUS FOR SENDING AND RECEIVING CODE SEQUENCE DATA

(75) Inventors: Shogo Oneda, Chiba (JP); Keiichi Suzuki, Tokyo (JP); Yukio Kadowaki, Nara (JP); Yutaka Sano, Miyagi (JP); Tooru Suino, Kanagawa (JP); Takanori Yano, Kanagawa (JP); Minoru Fukuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1061 days.

(21) Appl. No.: 10/714,204

(22) Filed: Nov. 14, 2003

(65) Prior Publication Data
US 2004/0151385 A1 Aug. 5, 2004

(30) Foreign Application Priority Data
Nov. 15, 2002 (JP) ............................. 2002-331723
Nov. 15, 2002 (JP) ............................. 2002-332173

(51) Int. Cl.
*G06K 9/36* (2006.01)
*G06K 9/46* (2006.01)
(52) U.S. Cl. ...................... 382/232; 382/233; 382/240; 382/245; 382/246; 382/250; 375/122; 341/51
(58) Field of Classification Search ............... 382/232, 382/233, 240, 245, 246, 250, 251; 345/543.1, 345/555; 375/122; 341/51
See application file for complete search history.

(56) References Cited

U.S. PATENT DOCUMENTS

| | | | | |
|---|---|---|---|---|
| 2002/0018597 A1* | 2/2002 | Kajiwara et al. | ........... | 382/233 |
| 2002/0099853 A1* | 7/2002 | Tsujii et al. | ................ | 709/247 |
| 2007/0237409 A1* | 10/2007 | Atsumi et al. | .............. | 382/239 |

FOREIGN PATENT DOCUMENTS

| | | |
|---|---|---|
| JP | 2000-115245 | 4/2000 |
| JP | 2001-274861 | 10/2001 |
| JP | 2001-359074 | 12/2001 |
| JP | 2002-034043 | 1/2002 |
| JP | 2002-261860 | 9/2002 |

OTHER PUBLICATIONS

Japanese Office Action, Notice of Rejection of Japanese Patent Application No. 2002-331723, Issue Date Mar. 20, 2007 (2 pages).
Japanese Office Action, Notice of Rejection of Japanese Patent Application No. 2002-332173, Issue Date Mar. 20, 2007 (2 pages).

* cited by examiner

*Primary Examiner*—Matthew C. Bella
*Assistant Examiner*—Ali Bayat
(74) *Attorney, Agent, or Firm*—Blakely, Sokoloff, Taylor & Zafman LLP

(57) ABSTRACT

An image sending apparatus is provided, in which the image sending apparatus comprises an analyzing syntax of code sequence data, a generation unit generating another code sequence data from the code sequence data by using the analysis result, a unit to measure the load of the generation unit; a unit to generate a parameter corresponding to the load, wherein the generation unit generates the another code sequence data by using the parameter such that the data amount of the another code sequence data to be sent is adjusted according to the load.

7 Claims, 23 Drawing Sheets

DECOMPOSITION_LEVEL_0

DECOMPOSITION_LEVEL_1

DECOMPOSITION_LEVEL_2

DECOMPOSITION_LEVEL_3

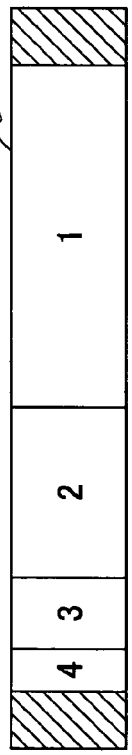
FIG.9A
FIG.9B

| COEFFICIENT | 1bit | 2bit | 3bit | 4bit |
|---|---|---|---|---|
| 1HH | 0.1 | 0.2 | 0.3 | 0.4 |
| 1LH | 0.4 | 0.5 | 0.6 | 0.7 |
| 1HL | 0.4 | 0.5 | 0.6 | 0.7 |
| 2HH | 0.4 | 0.5 | 0.6 | 0.7 |
| 2LH | 0.8 | 1.0 | 1.2 | 1.4 |

| WAVELET TRANSFORM COEFFICIENT | NUMBER OF QUANTIZATION BITS |
|---|---|
| 1HH | 5 |
| 1LH | 3 |
| 1HL | 3 |
| 2HH | 3 |
| 2LH | 2 |
| 2HL | 2 |
| 3HH | 2 |
| 3LH | 1 |
| 3HL | 1 |
| 3LL | 0 |

| INDEX | QUANTIZATION TABLE |
|---|---|
| 1 | 0, 0, 0, 0 ····· 0 |
| 2 | 1, 0, 0, 0 ····· 0 |
| 3 | 1, 1, 0, 0 ····· 0 |
| 4 | 1, 1, 1, 0 ····· 0 |
| 5 | 2, 1, 1, 0 ····· 0 |
| ⋮ | |
| X | 5, 3, 3, 3, 2, 2, 2, 1, 1, 0 |
| ⋮ | |
| Y | 8, 8, 8 ····· |

FIG.23

|  | HIGH SPEED | LOW SPEED |
|---|---|---|
| HIGH FRAME RATE | KEEP COMB SHAPE (KEEP 1LH MORE THAN 1HL) | DO NOT KEEP COMB SHAPE (KEEP 1LH AND 1HL SIMILARLY) |
| LOW FRAME RATE | DO NOT KEEP COMB SHAPE (KEEP 1LH AND 1HL SIMILARLY) | DO NOT KEEP COMB SHAPE (KEEP 1LH AND 1HL SIMILARLY) |

IMAGE SENDING APPARATUS AND IMAGE RECEIVING APPARATUS FOR SENDING AND RECEIVING CODE SEQUENCE DATA

The present application claims priority to the corresponding Japanese Application Nos. 2002-331723, filed on Nov. 15, 2002 and 2002-332173, filed on Nov. 15, 2002, the entire contents of which are hereby incorporated by reference.

BACKGROUND OF THE INVENTION

1. Field of the Invention

The present invention relates to an image sending apparatus and an image receiving apparatus for sending and receiving code sequence data.

2. Description of the Related Art

Conventionally, there exists a moving image delivering technology in which a client sends a transfer request of moving image data to a server, a server provides the moving image data, and the client reproduces the moving images by using the received moving image data. In the technology, for receiving moving image data from the server and reproducing moving images by the client, "download reproducing" and "stream reproducing" are known.

The download reproducing is to reproduce data downloaded into a buffer in the client from the server. According to this type, since the data which are once stored in the buffer are reproduced, there is a drawback in that the time length for reproducing moving image is short due to limitation of the memory capacity of the buffer. However, if the reproduction is performed after all data are received, there is an advantage in that the moving images can be reproduced regardless of process load of the server, the speed or traffic status of the transmission network, or the like.

On the other hand, according to the stream reproducing, a reproducing apparatus in the client side continuously requests data from the server, and the reproducing apparatus reproduces moving images in parallel with buffering the received data. According to this type, since the client continuously receives moving image data, the client reproduces the data in the buffer and discards the data in parallel with overwriting new data to the buffer. Therefore, there is an advantage in that long time reproduction of moving images is available without being affected by the limitation of memory capacity of the buffer.

However, there is a drawback in that the load of the server may increase according to increase of the number of clients simultaneously accessing the server, and the quality of the moving images is susceptible to the speed of the transmission line. Thus, there is a possibility of causing serious problems in that the reproduction of moving images stops due to an increase in the load of the server or a decrease of the speed of the transmission line. Generally, to avoid the serious problems, a method of scalability is used in which capacity of moving image data is changed.

MPEG1/MPEG2/MPEG4 are specific for moving images, and Motion JPEG in which still images are treated as continuous frames are conventionally used as image compression and decompression algorithms. As for the latter coding method of motion still images, a new method called Motion JPEG2000 is being standardized recently as an international standard.

However, according to the conventional moving image delivering technologies, generally, contents to be delivered are stored for a plurality of scalabilities beforehand in the server, and the user selects the most appropriate scalability according to the transmission capability of the transmission line and to the reproducing capability of the client to perform streaming reproduction.

In this case, since the user who operates the client selects an appropriate scalability in consideration of limitations of the transmission line, the most appropriate scalability cannot be selected by determining the load of the server that delivers image data to a plurality of clients simultaneously. Thus, when the load of the server becomes too large, transmission of code sequence data to each client is likely to delay, so that there occurs a problem in that the moving image data to be reproduced does not remain in the buffer in the client and the reproduction of moving images is interrupted.

In addition, not only it is inconvenient for the user to select the appropriate condition in consideration of the limitation of the transmission line, but also there is a problem in that the condition cannot be changed while the data are reproduced when the condition is once selected. That is, if the transmission line is suddenly congested while the streaming reproduction is performed, arrival of image data is likely to delay against the speed of image reproduction in the client, so that there occurs a problem in that the moving image data to be reproduced does not remain in the buffer in the client and the reproduction of moving images is interrupted.

SUMMARY OF THE INVENTION

An image sending apparatus and image receiving apparatus for sending and receiving code sequence data is described. In one embodiment, the image sending apparatus comprises a syntax analysis unit to analyze syntax of code sequence data, where the code sequence data is obtained by dividing moving image data into one or more small regions for each frame and performing hierarchical compression coding on each small region. The image sending apparatus further includes a code sequence generation unit to generate another code sequence data from the code sequence data by using the analysis result by the syntax analysis unit, a load measurement unit to measure the load of the code sequence generation unit, a parameter generation unit to generate a parameter corresponding to the load, a sending unit to send the another code sequence data. The code sequence generation unit generates the another code sequence data by using the parameter such that the data amount of the another code sequence data to be sent per a unit time is adjusted according to the load.

BRIEF DESCRIPTION OF THE DRAWINGS

Other objects, features and advantages of the present invention will become more apparent from the following detailed description when read in conjunction with the accompanying drawings, in which:

FIG. 9A shows information in a file of code sequence data including the original all subband data;

FIG. 9B shows information of code sequence data in which lower subband(s) are deleted;

FIG. 23 shows a table showing whether comb shape is remained or not;

DETAILED DESCRIPTION OF THE PREFERRED EMBODIMENTS

Figure 1:
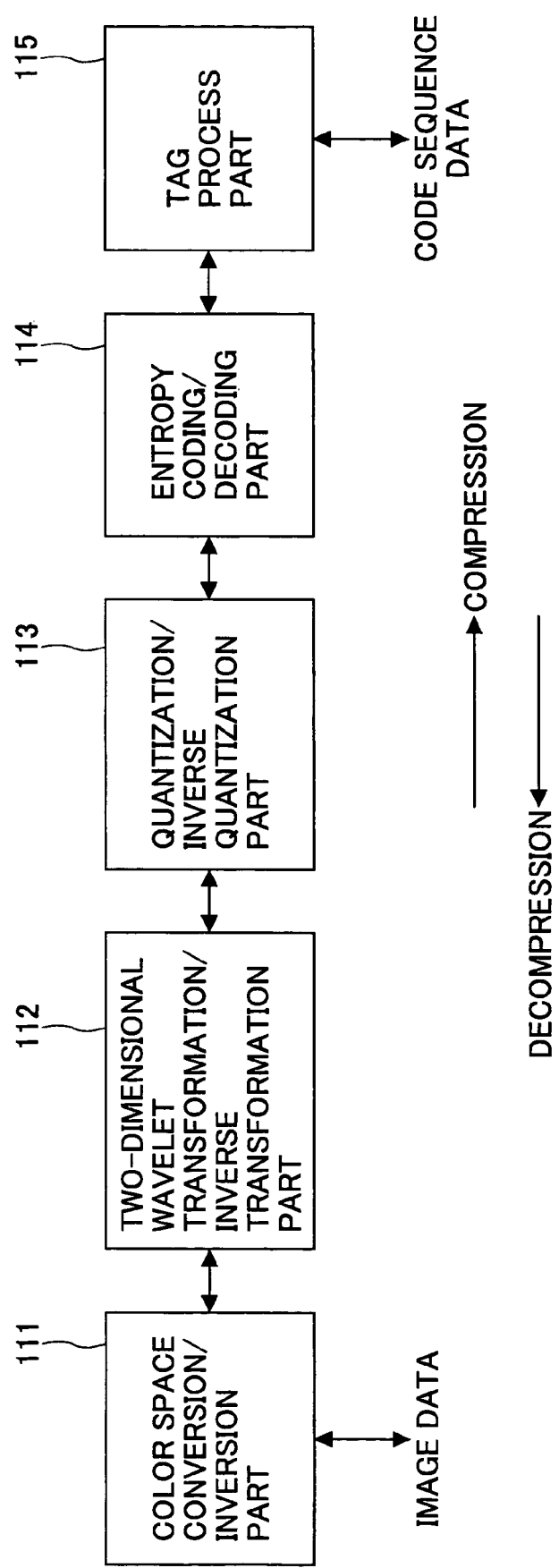
FIG. 1 is a figure for illustrating the principle of the JPEG2000 algorithm.

One or more embodiments of the present invention provide a technology for preventing interruption when reproducing moving images when streaming reproduction is performed. One or more embodiments of the present invention send image data by dynamically changing scalability according to the load of the sending side or according to traffic state of the network while suppressing deterioration of image quality.

One embodiment of the present invention comprises an image sending apparatus having: a syntax analysis unit for analyzing syntax of code sequence data, wherein the code sequence data is obtained by dividing moving image data into one or more small regions for each frame and performing hierarchical compression coding on each small region; a code sequence generation unit for generating another code sequence data from the code sequence data by using the analysis result by the syntax analysis unit; a load measurement unit for measuring the load of the code sequence generation unit; a parameter generation unit for generating a parameter corresponding to the load; and a sending unit for sending the another code sequence data. The code sequence generation unit generates the another code sequence data by using the parameter such that the data amount of the another code sequence data to be sent per a unit time is adjusted according to the load.

According to one embodiment of the present invention, the data amount is adjusted according to the load. That is, new code sequence data are generated such that moving images can be displayed without interruption with smaller amount of data. Thus, the interruption can be prevented when performing streaming reproduction.

Another embodiment of the present invention comprises an image sending apparatus having: a syntax analysis unit for analyzing syntax of code sequence data, wherein the code sequence data is obtained by dividing moving image data into one or more small regions for each frame and performing hierarchical compression coding on each small region; a code sequence generation unit for generating another code sequence data from the code sequence data by using the analysis result by the syntax analysis unit; a parameter generation unit for generating a parameter according to a sum of data reading amounts in the one or more image receiving apparatuses; and a sending unit for sending the another code sequence data to the one or more image receiving apparatuses. The code sequence generation unit generates the another code sequence data by using the parameter such that the data amount of the another code sequence data to be sent per a unit time is adjusted according to the sum of data reading amounts.

In still another embodiment, an image sending apparatus, comprises: a syntax analysis unit for analyzing syntax of code sequence data, wherein the code sequence data is obtained by dividing moving image data into one or more small regions for each frame and performing hierarchical compression coding on each small region; a code sequence generation unit for generating another code sequence data from the code sequence data by using the analysis result by the syntax analysis unit; a load measurement unit for measuring the load of the code sequence generation unit; and a difference amount generation unit for generating a difference amount corresponding to the load, wherein the difference amount is a difference amount of data between the code sequence data and the another code sequence data to be generated; and a sending unit for sending the another code sequence data. The code sequence generation unit generates the another code sequence data such that a difference amount between the code sequence data and the another code sequence data becomes the difference amount generated by the difference amount generation unit.

According to one or more embodiments of the present invention, the scalability can be dynamically changed according to the load. In addition, since difference amount of data is used instead of data amount itself, the unnecessary degrading of the image quality of a complicated scene may be prevented and using more than a necessary code amount may be prevented for a scene that is not complicated.

One such embodiment comprises an image sending apparatus, having: a syntax analysis unit for analyzing syntax of code sequence data, wherein the code sequence data is obtained by dividing moving image data into one or more small regions for each frame and performing hierarchical compression coding on each small region; a code sequence generation unit for generating another code sequence data from the code sequence data by using the analysis result of the syntax analysis unit such that a difference amount between the code sequence data and the another code sequence data becomes a specified difference amount; and a sending unit for sending the another code sequence data to an image receiving apparatus.

In the following, embodiments of the present invention are described with reference to figures.

General outline of JPEG2000 algorithm

First, the general outline of the JPEG2000 technology on which the embodiments of the present invention are based is described.

FIG. 1 is a figure for illustrating the principle of the JPEG2000 algorithm. The algorithm of JPEG2000 includes a color space conversion/inversion unit 111, a two-dimensional wavelet transformation/inverse transformation unit 112, a quantization/inverse quantization unit 113, an entropy coding/decoding unit 114, and a tag process unit 115.

Figure 2:
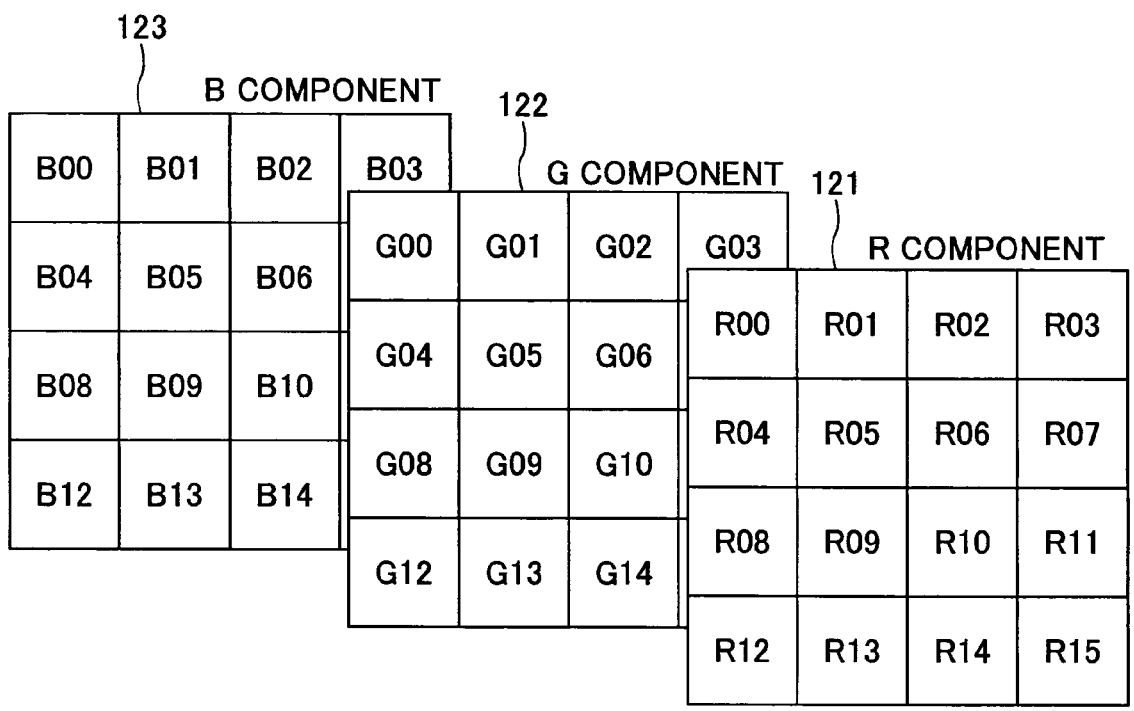
FIG. 2 is a figure for illustrating each component of color image.

As shown in FIG. 2, as to a color image, each component 121, 122, 123 (RGB primary colors) is divided into rectangular regions (each to be referred to as a tile). Each tile, for example, R00, R01, . . . , R15/G00, G01, . . . , G15/B00, B01, . . . , B15, is a basic unit for performing compression and decompression process. Therefore, the compression and decompression operation is performed independently for each component and for each tile.

When coding image data, data of each tile of each component are input into the color space conversion/inversion unit 111 shown in FIG. 1, so that color space conversion is performed on the data. After that, two-dimensional wavelet transformation (forward transformation) is performed on the data in the two-dimensional wavelet transformation/inverse transformation unit 112 so that the data are space-divided into frequencies.

Figure 3:
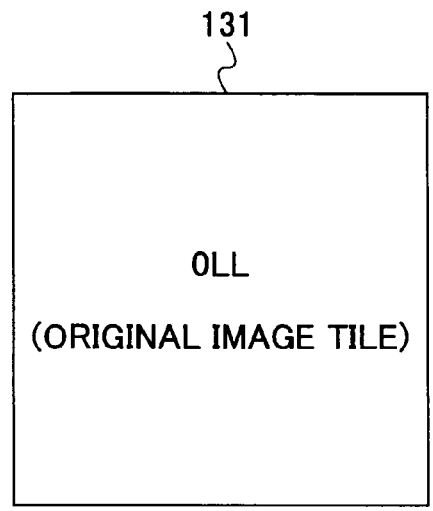
FIG. 3 shows subbands in each decomposition level when the number of decomposition levels is 3.
Figure 3:
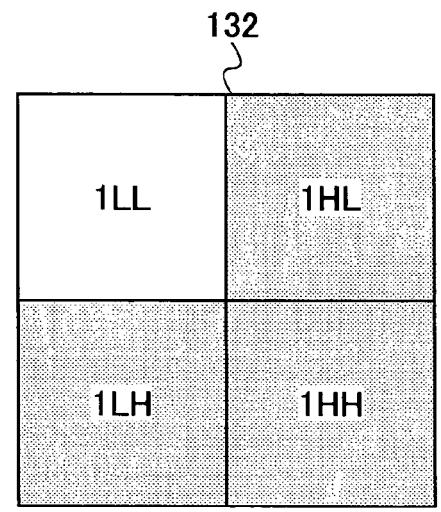
Figure 3:
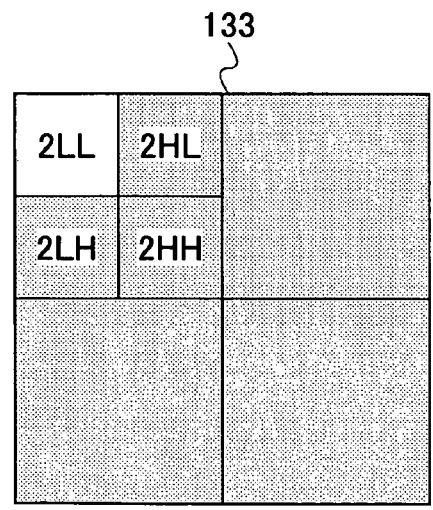
Figure 3:
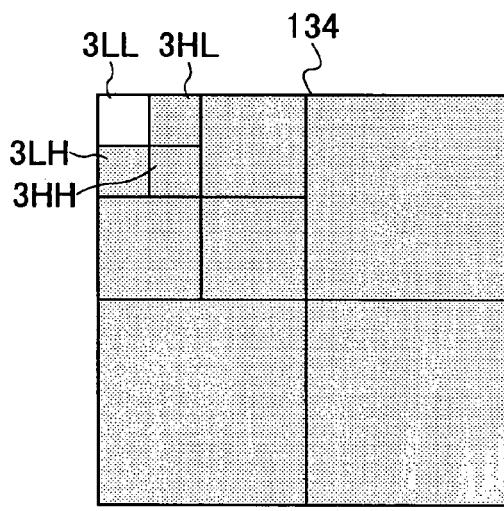

FIG. 3 shows subbands in each decomposition level when the number of decomposition levels is 3. That is, the two-dimensional wavelet transformation is performed on a tile original image (0LL) (decomposition level 0 (131)) that is obtained by dividing the original image into tiles, so that subbands are separated as shown in the decomposition level 1 (132). After that, the two-dimensional wavelet transformation is performed on a low frequency component 1LL at the level, so that subbands (2LL, 2HL, 2LH, 2HH) are divided as shown in decomposition level 2 (133). In the same way, the two-dimensional wavelet transformation is performed on a low frequency component 2LL, so that subbands (3LL, 3HL, 3LH, 3HH) are separated as shown in decomposition level 3 (134). Further, in FIG. 3, subbands to be coded are shown as shaded areas for each decomposition level. For example, when the number of the decomposition levels is 3, the shaded subbands (3HL, 3LH, 3HH, 2HL, 2LH, 2HH, 1HL, 11H, and 1HH) are to be coded, but the 3LL subband is not coded.

Figure 5:
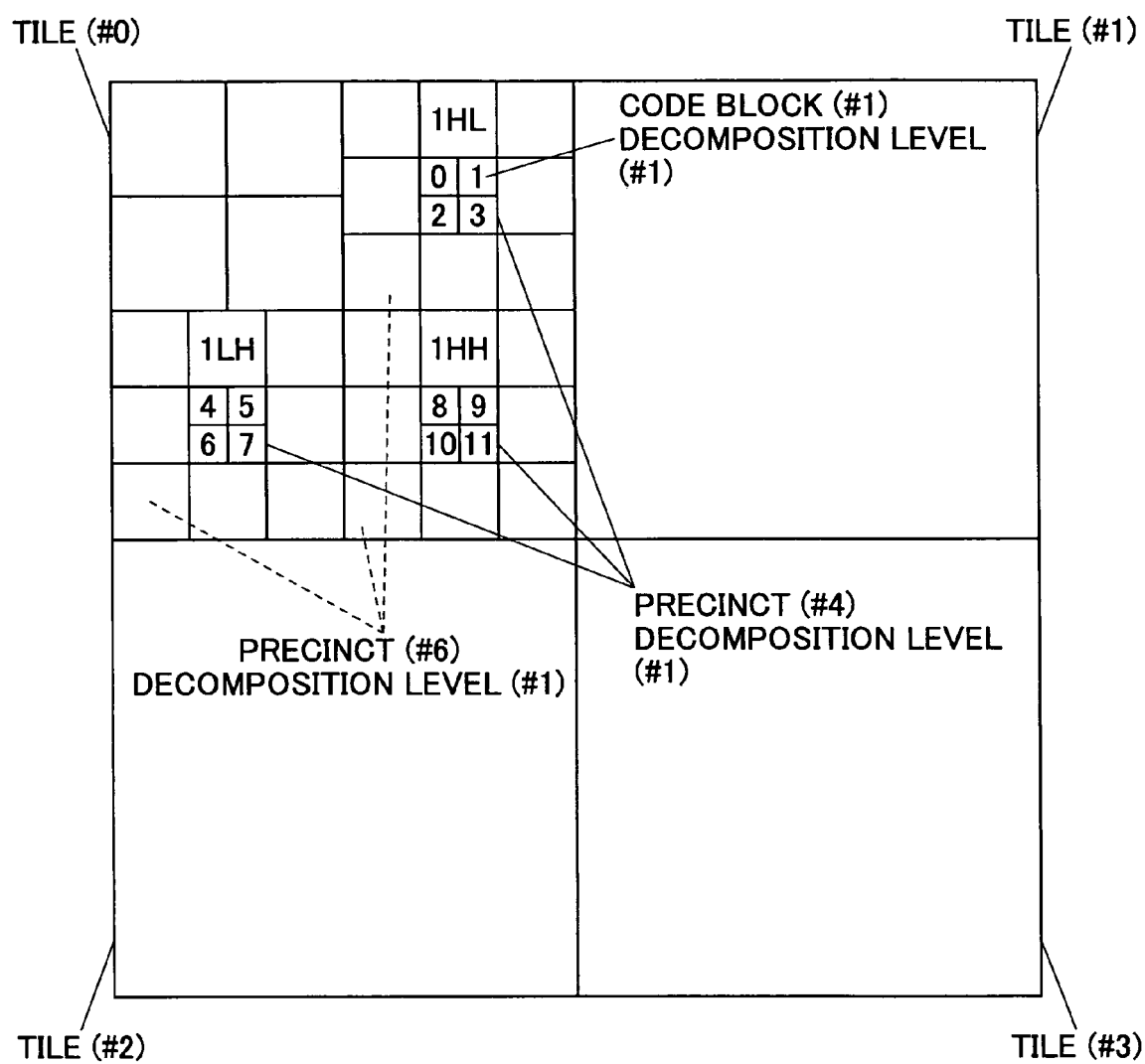
FIG. 5 shows that a precinct consists of three rectangular regions that are spatially the same.

Next, bits to be coded are determined in a specified order of coding, so that the context is generated from bits around the subject bit in the quantization/inverse quantization unit 113 shown in FIG. 1. A wavelet coefficient on which quantization has been performed are divided into rectangles called "precincts" that are not overlapping. The precincts are introduced for efficiently using the memory for implementation. As shown in FIG. 5, one precinct has three rectangle regions that are spatially the same. In addition, each precinct is divided into rectangular "code blocks" that are not overlapping. The code block is a basic unit for performing entropy coding.

Figure 6:
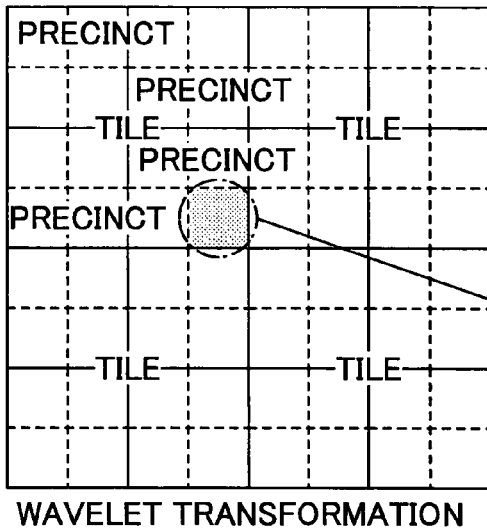
FIG. 6 illustrates that the coefficient is divided into "bit plane" units and priorities are set for the bit planes for each pixel or each code block.

Although the coefficient after wavelet transformation is performed can be quantized and coded, the coefficient is divided into "bit plane" units and priorities can be set for the bit planes for each pixel or each code block for improving efficiency of coding in JPEG2000. FIG. 6 shows the general outline of the procedure. This example shows a case where an original image (32×32 pixels) is divided into four tiles each tile having 16×16 pixels, in which the sizes of the precinct and the code block of the decomposition level 1 are 8×8 pixels and 4×4 pixels respectively. Each number of the precinct and the code block is assigned in a rastering order. A mirroring method is used for pixel extension to the outside of the boundary of the tile, and wavelet transformation is performed by using a reversible (5×3) filter, so that wavelet coefficients of the decomposition level 1 are obtained. In addition, FIG. 6 also shows the concept of typical "layer" as to tile 0/precinct 3/code block 3. The structure of the layer can be easily understood by viewing the wavelet coefficients from cross direction (bit plane direction). One layer includes any number of bit planes. In this example, the layers 0, 1, 2 and 3 consist of 1, 3, 1, 3 bit planes respectively. A layer including a bit plane near the LSB is quantized first. On the other hand, a layer near the MSB has not been quantized. The method of discarding bit from the layer near the LSB is called truncation by which quantization ratio can be controlled in detail.

Figure 4:
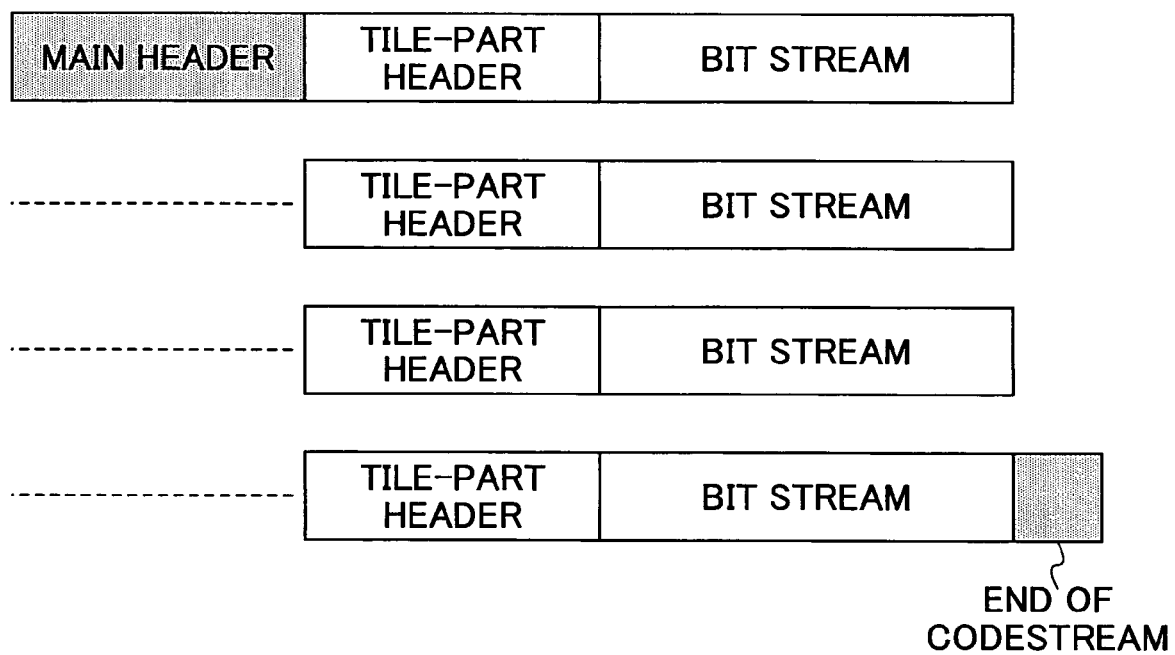
FIG. 4 shows the structure of the code stream.

In the entropy coding/decoding unit 114 (FIG. 1), the coding for tile of each component is performed by performing probability estimation from context and subject bit. Accordingly, the coding process is performed for each tile for every component of the original image. Finally, the tag process unit 115 combines all coded data from the entropy coder unit into one code stream, and adds a tag to the code stream. FIG. 4 shows the structure of the code stream. As shown in FIG. 4, tag information called a header is added to the head of the code stream and to each head of partial tiles that form each tile. Coded data of the tile continues after the header. A tag is placed again at the end of the code stream.

When decoding, inversely to coding, image data is generated from the code stream of each tile of each component. The general outline is described with reference to FIG. 1. In this case, the tag process unit 115 interprets tag information added to the code stream input from the outside, divides the code stream into code streams of each tile of each component, and decoding is performed for each of the code streams of each tile of each component. The position of bit to be decoded is determined in an order based on tag information in the code stream. The quantization/inverse quantization unit 113 generates context from the arrangement of (already decoded) bits surrounding subject bit position. The entropy coding/decoding unit 114 performs decoding by estimating probability from the context and code streams, so that subject bit is generated and is written in the position of the subject bit. Since the thus decoded data are space-divided for each frequency bands, each tile of each component of the image data can be reproduced by performing a two-dimensional wavelet inverse transformation in the two-dimensional wavelet transformation/inverse transformation unit 112. The reproduced data are converted into the original color data by the color space conversion/inversion unit 111.

In the following, an embodiment of the present invention is described.

Figure 7:
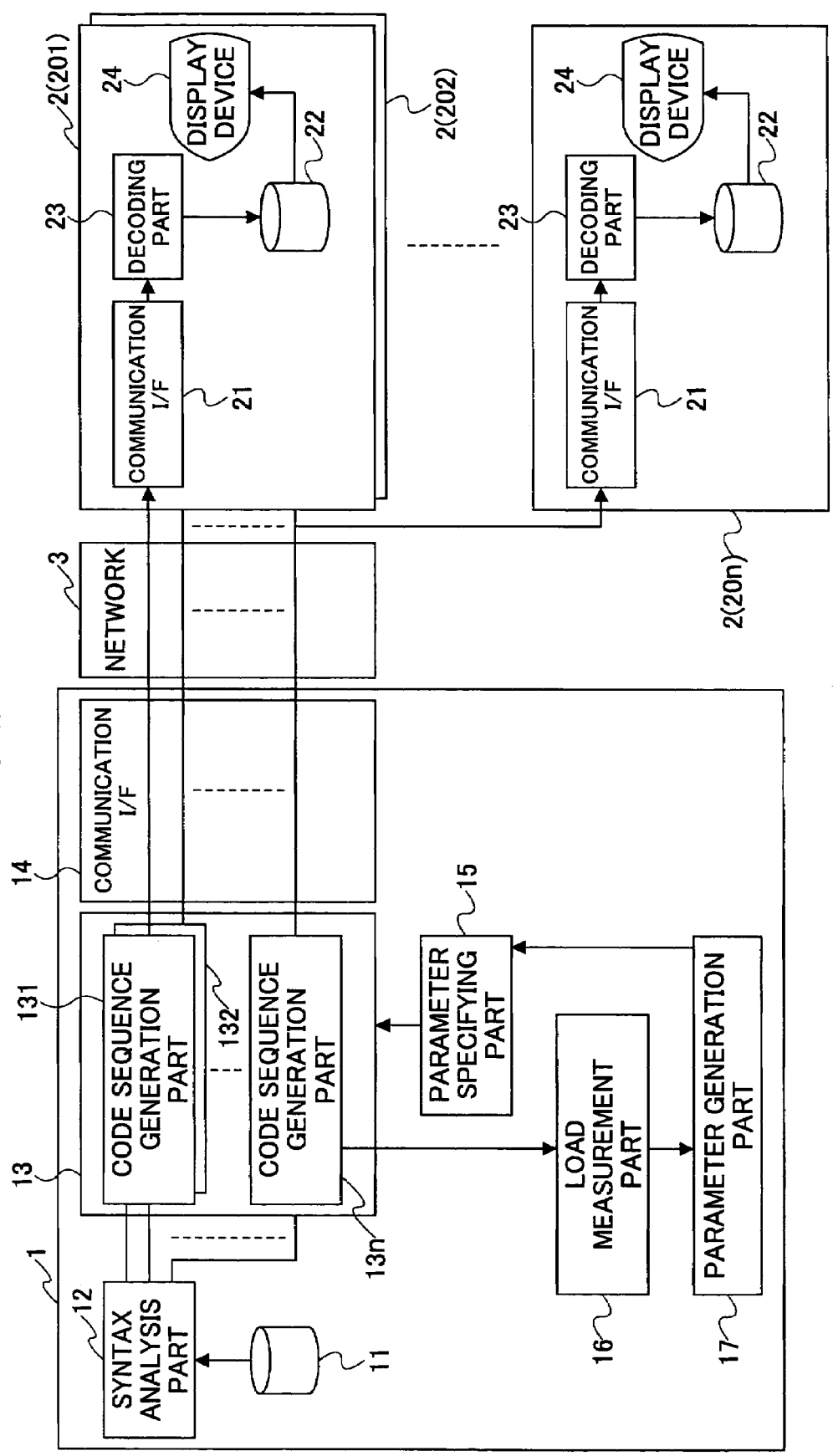
FIG. 7 is a block diagram showing the whole system configuration of an embodiment.

FIG. 7 is a block diagram showing the whole system configuration of one embodiment. In FIG. 7, a server 1 and clients 2 are connected via a communication network 3. The server 1 includes a magnetic storage 11 for storing moving image data. The magnetic storage 11 stores code sequence data that are obtained by performing compression coding on original moving image data by using the MOTION JPEG2000 algorithm. More specifically, the code sequence data are generated by dividing the moving image data into one or more rectangular regions (tile) for each frame, performing discrete wavelet transform (DWT) on pixel values for each tile so as to perform hierarchical compression coding.

When sending the code sequence data to a client 2, a syntactic analysis unit 12 analyzes the syntax of the code sequence data, that is, information described in the header. A code sequence generation unit 13 (one of code sequence generation units 131-13*n*) generates another code sequence data from the code sequence data on the basis of the analysis result. Then, the generated code sequence data are sent to the client 2 over the communication network 3 via a communication interface 14. The code sequence generation units 13 can generate a plurality of pieces of code sequence data in parallel for a plurality of clients. The code sequence generation units 13 include code sequence generation units 131-13*n* (n=1, 2, 3, . . . , n) each generating code sequence data.

A parameter specifying unit 15 specifies a parameter used for the code sequence generation unit 13 to generate the new code sequence data. By changing the parameter, the amount of data per a unit time can be adjusted when the code sequence data are sent.

A load measurement unit 16 measures the load of the code sequence generation units 13. The load can be determined according to the number of the pieces of the code sequence data being generated in parallel in the code sequence generation units 13. That is, the load can be determined according to the number of operating ones in the code sequence generation units 131-13*n*.

A parameter generation unit 17 generates the parameter used for generating the new code sequence data by the code sequence generation units 13 according to the load measured by the load measurement unit 16.

More specifically, for example, the parameter is a parameter on image resolution or frame rate that are obtained when decoding the code sequence data, or is a parameter on image quantization level. More specifically, the parameter can be generated in the following way, for example.

That is, a threshold is provided for a measurement value of the load measured by the load measurement unit 16, and, when the load is lower than the threshold, the parameter is determined such that the data amount per a unit time sent to each client is large. More specifically, the parameter is generated such that the image resolution becomes high (higher than a predetermined value), the frame rate becomes large, or the image quantization level becomes fine.

If the load exceeds the threshold, since the load of the code sequence generation units 13 is large, the parameter is determined such that the data amount per a time unit for sending the code sequence data is decreased. That is, the parameter is determined such that the image resolution becomes low, the frame rate becomes low, or the image quantization level becomes rough.

Figure 8A:
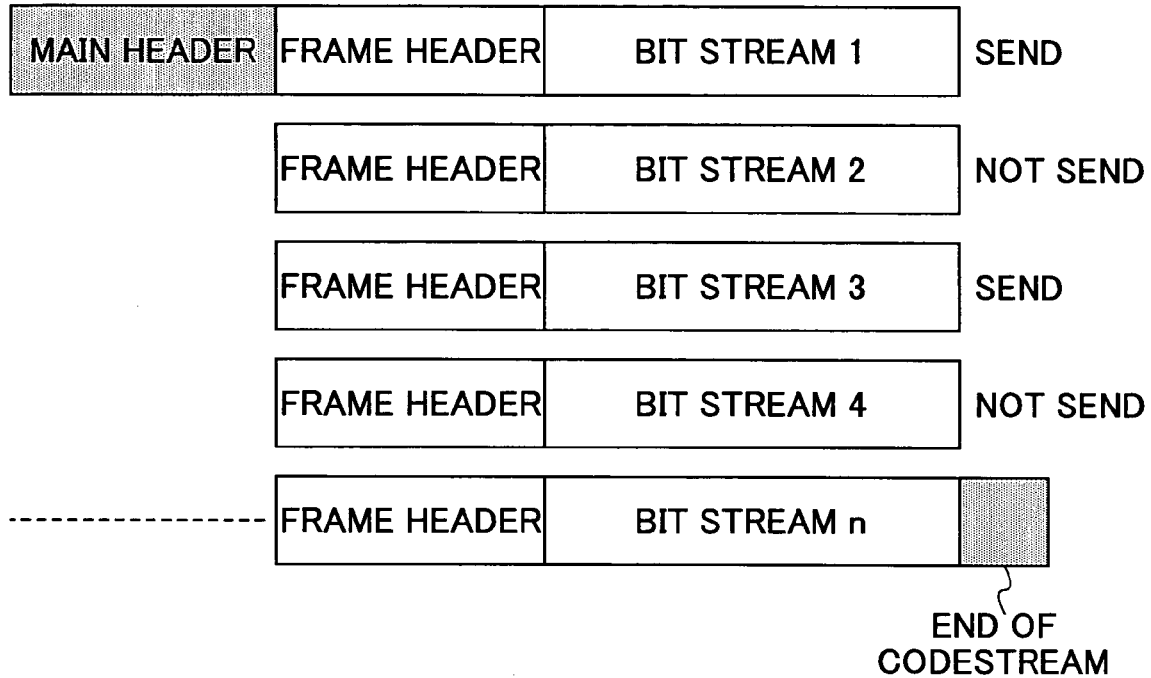
FIG. 8A shows original code sequence data.
Figure 8B:
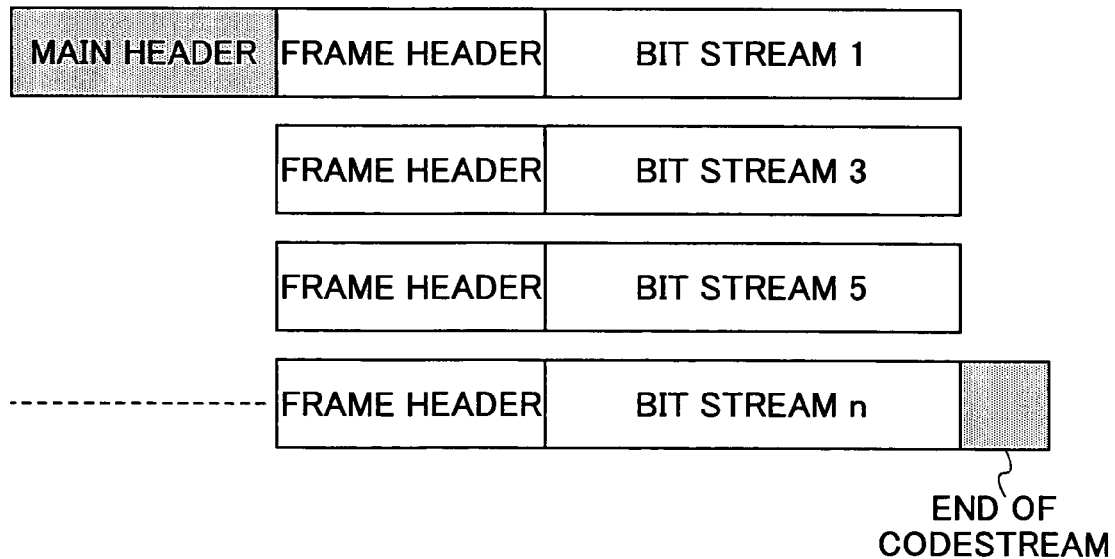
FIG. 8B shows code sequence data in which even-numbered frames (2, 4, . . . ) are deleted.

As to adjusting the frame rate, the parameter is determined such that all frames are sent when the load is small. The frame rate is decreased according to increase of load as shown in FIGS. 8A and 8B. FIG. 8A shows the original code sequence data. The code sequence data includes n frames (bit streams). FIG. 8B shows how to decrease the frame rate. As shown in FIG. 8B, even-numbered frames (2, 4, . . . ) are deleted, so that only one frame in two frames is sent. Thus, the frame rate can be lowered to the half, so that the data amount can be decreased to the half. When deleting the even-numbered frames, only odd-numbered frames (1, 3, . . . ) are connected, and the header is rewritten according to the change, so that a new code sequence is generated.

As to adjustment of image resolution, when the load is low, the parameter is determined such that all subbands are sent for sending high resolution image data. However, as the load increases, sending of lower subband(s) is stopped, so that low resolution image data are sent.

FIG. 9A shows information in a file of code sequence data including the original all subband data. In this example, the code data are arranged in an order of subbands. A delimiter is provided in each boundary of subbands, so that the boundary can be easily determined. When the load is low, subbands from the first to the last subband (0) are sent. As the load increases, a new code sequence shown in FIG. 9B is generated by deleting lower subband(s) such that only subband 1 or subbands 1, 2 or 1-3 can be sent. The subband(s) after the sent subbands are not sent.

Figure 10A:
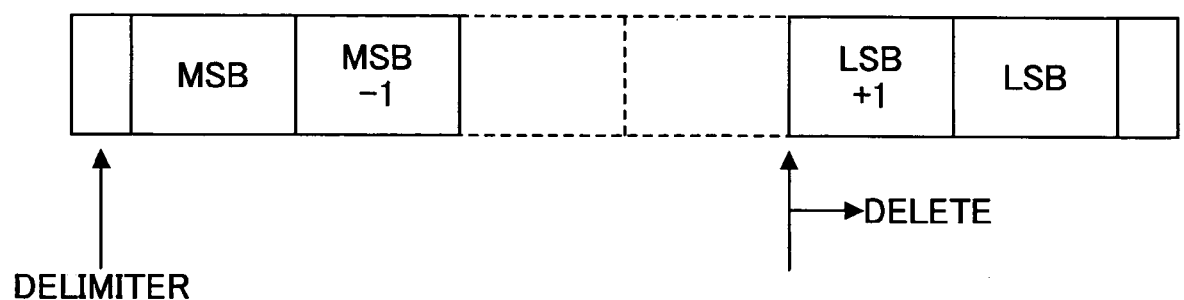
FIG. 10A shows a subband in the code sequence shown in FIG. 9A.
Figure 10B:
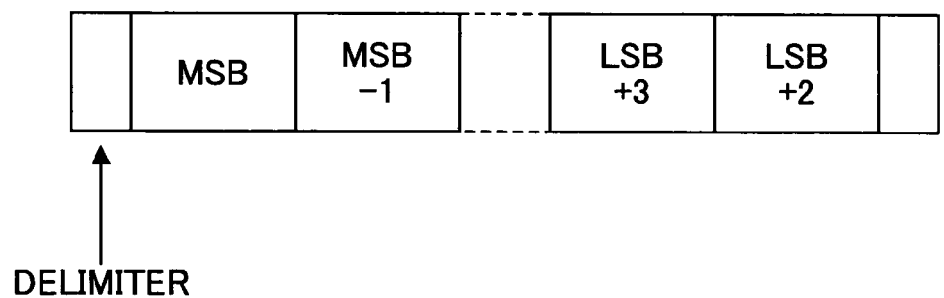
FIG. 10B shows a subband in which two bit planes are discarded.

In another example for adjusting data amount, FIG. 10A shows a subband in the code sequence shown in FIG. 9A. In the subband, coded data are included from the MSB of bit plane to the LSB. In the example of FIG. 10A, data of two bit planes are discarded from LSBs of the original data, so that a new code sequence is generated as shown in FIG. 10B to decrease the amount of data.

As shown in FIG. 7, the client 2 reproduces moving images by the streaming reproduction method. That is, each client (client 201, 202, 203, . . . , 20*n*) receives the code sequence data generated either one of the code sequence generation units 131-13*n* via the communication interface 21. Then, the received code sequence data are decoded by a decoding unit 23, and the decoded moving image data are buffered in a buffer 22, and are displayed on a display apparatus 24.

The code sequence data stored in the magnetic storage 11 are hierarchically compression coded by using the JPEG2000 (Motion JPEG2000) algorithm. Thus, the syntactic analysis unit 12 analyzes the syntax of the code sequence data, and the code sequence generation unit generates new code sequence data from the original code sequence data by selecting necessary data according to the analyzed syntax such that image resolution or frame rate or image quantization level specified by the parameter can be obtained.

The parameter can be generated for a plurality of times, for example, periodically while the client 2 reproduces one piece of moving image data. More specifically, the parameter can be generated every one minute or every five minuets while the client 2 reproduces the moving image data. Therefore, the image resolution, frame rate, or image quantization level can be changed while the client 2 reproduces one piece of moving image data.

According to one embodiment, when the load of the code sequence generation units 13 is large, the parameter is changed such that the image resolution is lowered, the frame rate is lowered, or the image quantization level becomes rough. Thus, the data amount sent to the client 2 from the server 1 can be decreased and the reproduction of the moving image is not stopped. Since the parameter is one for determining the image resolution, frame rate or image quantization level, the effect on the quality of image is relatively small even though the image resolution is lowered, the frame rate is lowered or the quantization level is rough.

In the following, another embodiment of the present invention is described.

Figure 11:
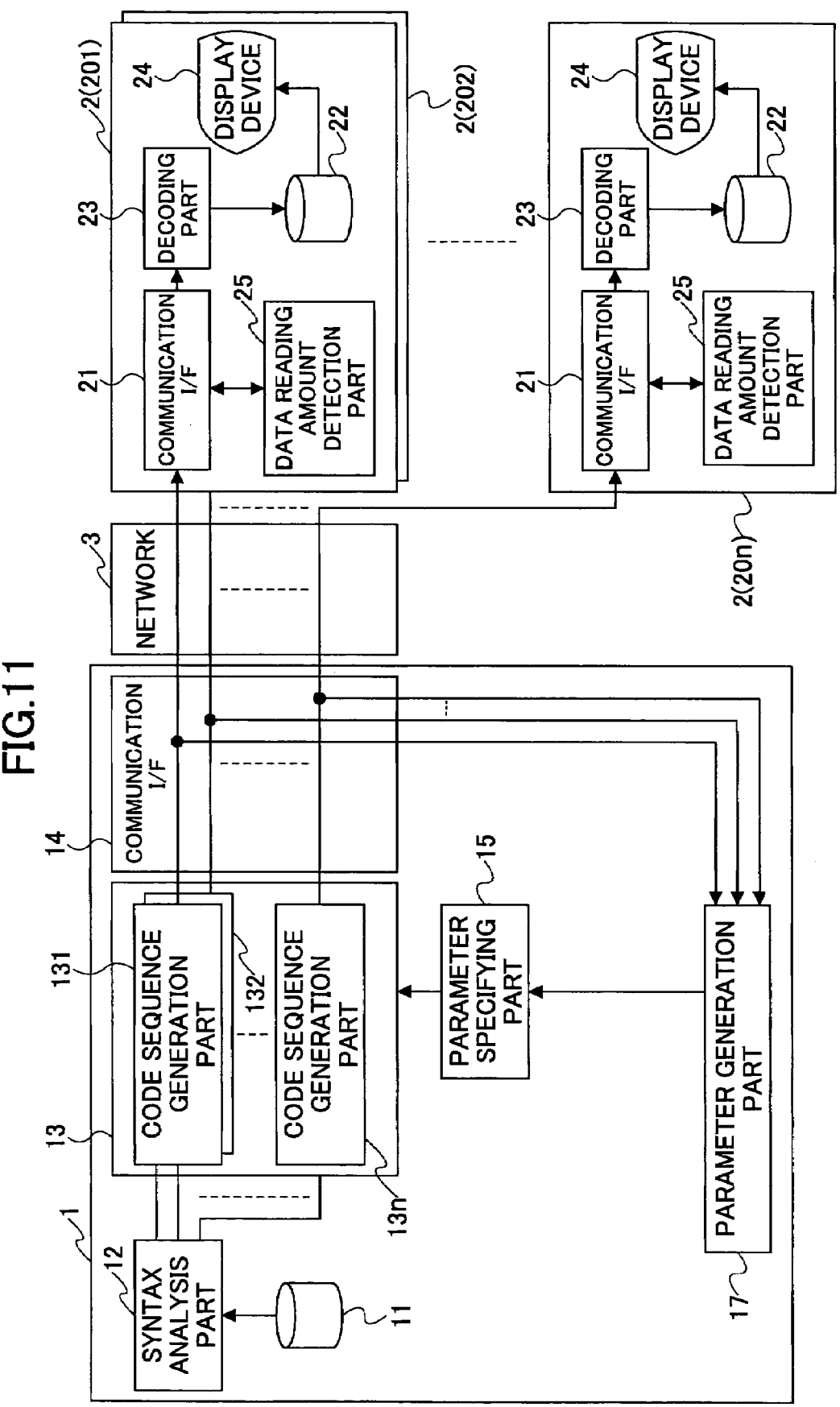
FIG. 11 shows a block diagram showing a server and clients according to an embodiment.

FIG. 11 shows a block diagram showing the server 1 and the clients 2 according to this embodiment. Compared with the previously described embodiment, the server 1 of the this embodiment does not include the load measurement unit 16 of the previously described embodiment, and the client 2 of the this embodiment includes a data reading amount detection unit 25 that is not included in an embodiment described above. As for functions of other units, both embodiments are the same.

The data reading amount detection unit 25 in the client 2 detects a reading amount per a unit time of code sequence data received from the server 1. For example, the data reading amount detection unit 25 detects a data reading amount An (n=1, 2, ..., this number corresponds to a client) per one second (that is, the unit time is bps). The data reading amount detection unit 25 continues to detect the data reading amount while receiving code sequence data from the server 1. The detected value of the data reading amount is sent to the server 1 via the communication interface 21, for example, per one minute while the client receives the code sequence data from the server 1.

The server 1 receives the detected values of the data reading amount from each client, so that the parameter generation unit 17 generates the before-mentioned parameter on the basis of the data reading amounts.

More specifically, assuming that C is a usage rate of the communication network 3 (for communication between the server 1 and the clients 2), and that data transfer capability of the network 3 is B, that is, assuming that the maximum data delivering capability of the server 1 is B, C can be obtained by the following equation: $C = \Sigma An/B$.

C can be calculated by calculating the sum total of the data reading amounts and by dividing the sum total by B. The usage rate C indicates congesting state of the communication network 3. The parameter generation unit 17 determines that communication network 3 is congested if the usage rate C is greater than a predetermined threshold c. Then, the parameter generation unit 17 determines the parameter such that the data amount of the code sequence data per a unit time sent by each code sequence generation unit becomes small. For example, the parameter generation unit 17 determines a parameter such that the data amount of the code sequence data per a unit time sent by each code sequence generation unit becomes smaller than a threshold or becomes smaller by a step. In this case, the quality of the moving image of the code sequence data deteriorates more or less. On the other hand, if the usage rate C is smaller than the predetermined threshold c, the parameter generation unit 17 determines that the communication network 3 is not congested, so that the parameter generation unit 17 determines the parameter such that the data amount of the code sequence data per a unit time sent by each code sequence generation unit becomes large. For example, the parameter generation unit 17 determines the parameter such that the data amount of the code sequence data per a unit time sent by each code sequence generation unit becomes larger than a threshold or becomes larger by a step. In this case, the quality of the images of the code sequence data improves.

A plurality of thresholds may be provided as the threshold c, so that the parameter can be changed gradually according to the thresholds. As a result, the data amount sent by the code sequence generation unit can be adjusted gradually according to the parameter changed on the basis of the plurality of thresholds. Alternatively, the parameter may be changed continuously according to the usage rate C, so that the data amount of the code sequence data per a unit time sent by the code sequence generation unit can be adjusted seamlessly.

As the parameter, one or some of image resolution (number of dots of image), S/N (compression ratio of compression algorithm), frame rate (number of frames per a unit time) can be used. That is, by increasing the image resolution, S/N or frame rate, the data amount of sent code sequence data increases.

For changing the frame rate and the image resolution by the parameter, the methods described in the previously described embodiment can be used.

In the following still another embodiment of the present invention is described.

In the previously described embodiments, the data amount to be sent to the client is changed according to the load of the server or the traffic state of the network. However, when only the data amount is controlled like the above-described embodiments, the image quality of a complicated scene may be degraded unnecessarily. In addition, as for a scene that is not complicated, a code amount more than necessary may be used, so that efficiency of use of transmission line may be decreased. In the following embodiments, a difference amount between original code sequence data and newly generated code sequence data is adopted for controlling data amount for improving the above-mentioned problems.

Figure 12:
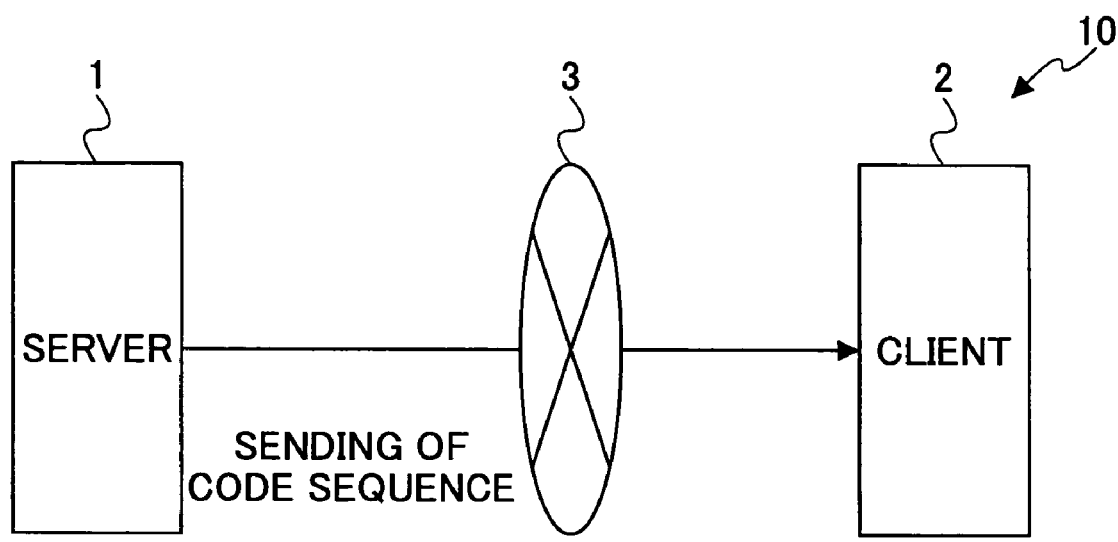
FIG. 12 shows a block diagram of a network system 10 of an embodiment.

FIG. 12 shows a block diagram of a network system 10 of another embodiment. As shown in FIG. 12, the network system includes a server 1 and a client 2 that are connected to a network 3 such as the Internet. The server 1 sends, via the network 3 such as the Internet, code sequence data obtained by performing compression coding on moving image data by using an algorithm such as the Motion JPEG2000. The client 2 receives the code sequence data from the server 1. A plurality of clients may be connected simultaneously (clients 20n (n=1, 2, ...) shown in FIG. 14).

Figure 13:
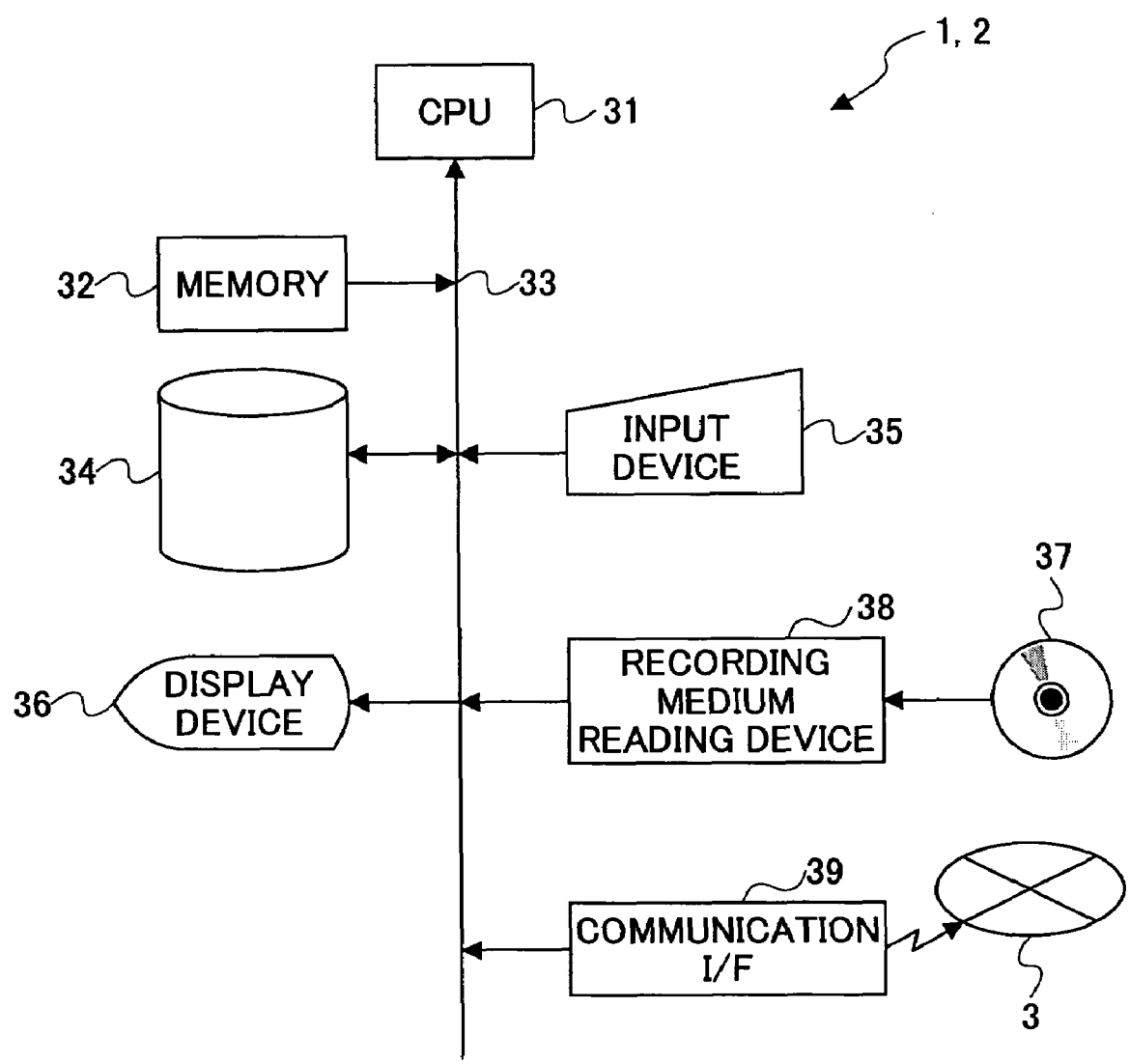
FIG. 13 is a block diagram showing the electronic configuration of a server according to embodiments of the present invention.

FIG. 13 is a block diagram showing the electronic configuration of the server 1. FIG. 8 also shows the configuration of the client 2. In the configuration, a CPU 31 and a memory 32 are connected by a bus 33, in which the CPU 31 controls each unit of the server 1 (or client 2), and the memory 32 includes various ROMs or RAMs.

The bus 33 is connected to a magnetic storage 34 such as a hard disk and the like, an input device 35 including a mouse and a keyboard and the like, a display device 36 such as a LCD or a CRT or the like, a recording medium reading device 38 for reading a recording medium 37 such as an optical disk, and a communication interface 39 for communicating with the network 3. As the recording medium, various media can be used such as an optical disk such as CD or DVD, an optical magnetic disk, a flexible disk and the like. As the recording medium reading device 38, an optical disk drive, an optical magnetic disk drive, a flexible disk drive and the like can be used according to the type of the recording medium 37.

In the magnetic storage 34, an image sending program (or an image receiving program) is stored. Generally, the image sending program (image receiving program) is read from the recording medium 37 and written into the recording medium reading apparatus 38, so that the program is installed in the server 1 (or client 2). The program is also downloaded via the network 3 and installed in the magnetic storage 34. By installing the program, the server 1 and the client 2 become operable. Each of the image sending program and the image receiving program may form a part of a specific application software program. Each of the image sending program and the image receiving program may operate on a predetermined OS.

The above-mentioned configuration described with reference to FIGS. 12 and 13 can apply to other embodiments of the present invention.

Figure 14:
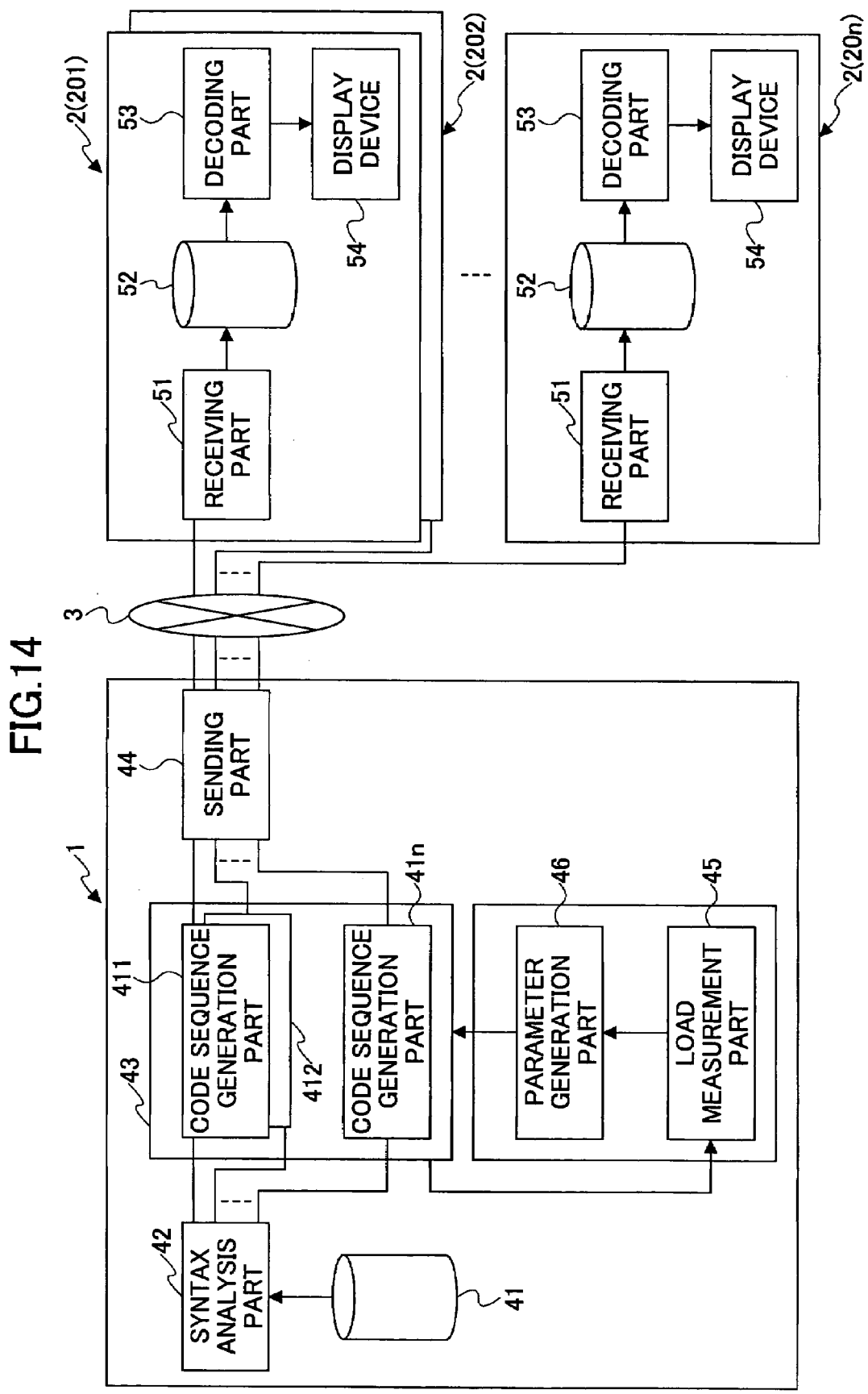
FIG. 14 is a functional block diagram for illustrating operations of the network system 10 according to an embodiment.

FIG. 14 is a functional block diagram for illustrating operations of the network system 10.

First, processes performed by the server 1 are described. A buffer 41 (in the magnetic storage 34) in the server 1 stores code sequence data obtained by performing compression coding on moving image data by using Motion JPEG2000 algorithm as shown in the previously described embodiment and the like. The server 1 delivers the code sequence data as a stream according to a request from each client 201-20$n$. More specifically, a syntax analysis unit 42 analyzes the syntax of the code sequence data from header information. As a result of the analysis, each of the code sequence generation units 411-41$n$ in the code sequence generation unit 43 converts the code sequence data to new code sequence data according to the Motion JPEG2000 algorithm. Then, a send and receive unit 44 sends the converted new code sequence data to clients 2 via the communication interface 39 and the network 3.

A load measurement unit 45 measures the process load of the code sequence generation unit 43. The load can be determined by using the number of code sequences that are simultaneously generated in the code sequence generation unit 43. That is, the load can be determined by the number of the code sequence generation units that are operating among the code sequence generation units 411-41$n$ in the code sequence generation unit 43. When the number is large, it means that the process load of the code sequence generation unit 43 is large.

The parameter generation unit 46 generates, from the load measured by the load measurement unit 45, a parameter used for each code sequence generation unit to generate new code sequence data. More specifically, the parameter indicates a difference amount between the original code sequence data and the new code sequence data that is generated by a code sequence generation unit. Alternatively, the parameter may indicate a frame rate of moving image for the new code sequence data.

More specifically, the parameter can be determined in the following way. A threshold is provided for the load measured by the load measurement unit 45. If the load is lower than the threshold, the new code sequence data is generated such that a data amount per a unit time becomes large. In this case, the parameter is generated such that the difference amount decreases in which the frame rate becomes large or image quantization level becomes fine.

If the load is higher than the threshold, the code sequence data are generated such that the data amount per a unit time becomes small. That is, the parameter is generated such that the frame rate becomes small or such that the image quantization level becomes rough.

Next, processes performed by the client 2 are described. In each client, a receiving unit 51 receives the code sequence data via the communication interface 39. Then, the received code sequence data are stored in the buffer 52 (in the magnetic storage). A decoding unit 53 decodes the code sequence data and a display unit 54 displays moving images on a display device 36.

Figures 15, 16:
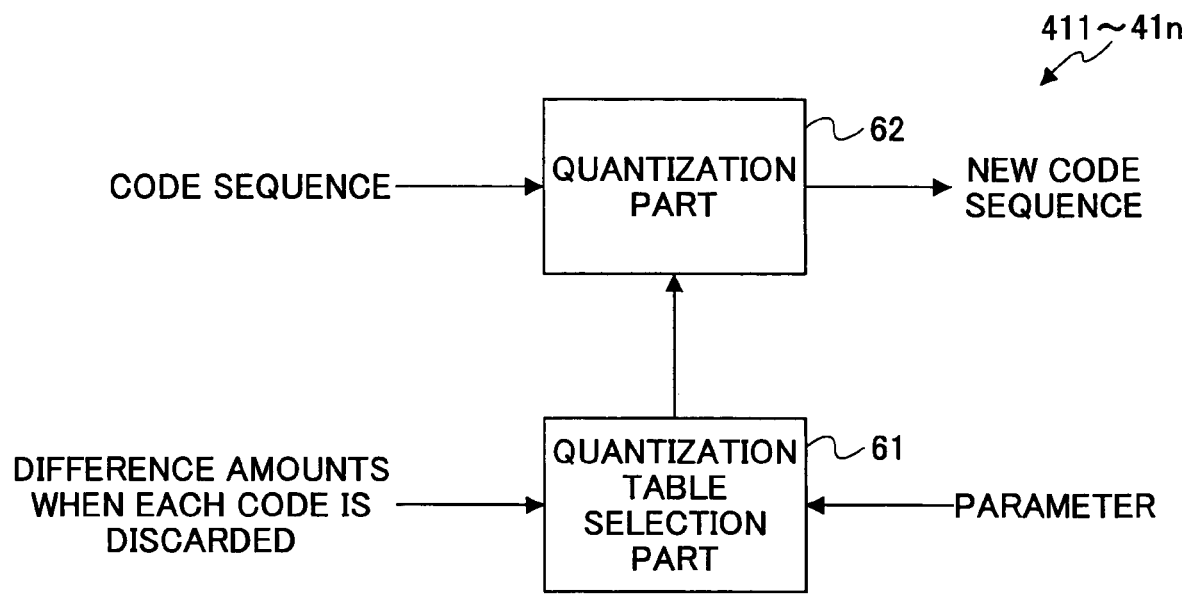
FIG. 15 is a block diagram showing a configuration example of each code sequence generation unit.
FIG. 16 shows an example of data of difference amounts stored in the header information.

In the following, a case where the before mentioned difference amount is used as the parameter is described. FIG. 15 is a block diagram showing a configuration example of each code sequence generation unit (411-41$n$). The code sequence generation unit includes a quantization unit 62 and a quantization table selection unit 61. The parameter indicating the difference amount generated by the parameter generation unit 46 is input in the quantization table selection unit 61. As to the code sequence data buffered in the buffer 41, the header information is analyzed by the syntax analysis unit 42. Then, according to the header information, difference amounts are input in the quantization table selection unit 61. Each of the difference amounts obtained according to the header information is a difference amount between the original code sequence data and the new code sequence data in which codes are partially discarded from the original code sequence data. Since there are a plurality of patterns for partially discarding codes, a plurality of difference amounts are obtained and input in the quantization table selection unit 61. The quantization table selection unit 61 selects predetermined table data (quantization table) on the basis of the input difference amounts and the parameter, and sends the table data to the quantization unit 62. More specifically, the quantization table selection unit 61 calculates each difference amount corresponding to each quantization table by using the input difference amounts. That is, the calculated difference amount corresponding to a quantization table is a difference amount between the code sequence data and the new code sequence data that is obtained by discarding codes according to the quantization table. For calculating the difference amount corresponding to a quantization table, the input difference amounts are used.

Then, the quantization table selection unit 61 selects a quantization table such that the calculated difference amount corresponds to the input parameter (specified difference amount).

The quantization unit 62 selectively discards codes from the code sequence data according to the selected quantization table. In addition, the quantization unit 62 rewrites the header so as to generate the new code sequence data. As mentioned above, since the code sequence generation unit 411-41$n$ can generate the new code sequences, a plurality of processes for generating the new code sequences can be performed in parallel.

The difference amounts that are input into the quantization table selection unit 61 from the syntax analysis unit are stored beforehand in the header information, for example. The difference amounts are stored as data shown in FIG. 16, for example. The data shown in FIG. 16 show difference amounts when bit plane(s) are discarded for each wavelet coefficient (for each coefficient for each decomposition level). Each difference amount may be an accurate value or an estimated value. Although the unit of each difference amount shown in FIG. 16 is a percentage, any unit can be adopted for the difference amounts. The data shown in FIG. 16 are input into the quantization table selection unit 61. Then, the quantization table selection unit 61 calculates each difference amount for the code sequence data for each quantization table from the data of FIG. 16, and determines a quantization table by which the calculated difference amount is the difference amount specified by the parameter. The quantization tables may be stored in the magnetic storage 41.

As to the header information, the difference amount can be stored in the COM marker segment in the main header or in the tile header.

Figures 17, 18:
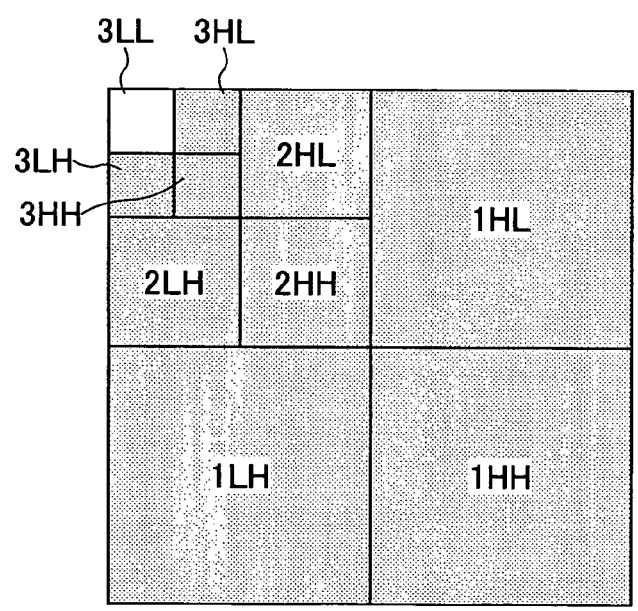
FIG. 17 shows an example of a quantization table.
FIG. 18 shows an example of wavelet transform coefficients.
Figures 19, 20:
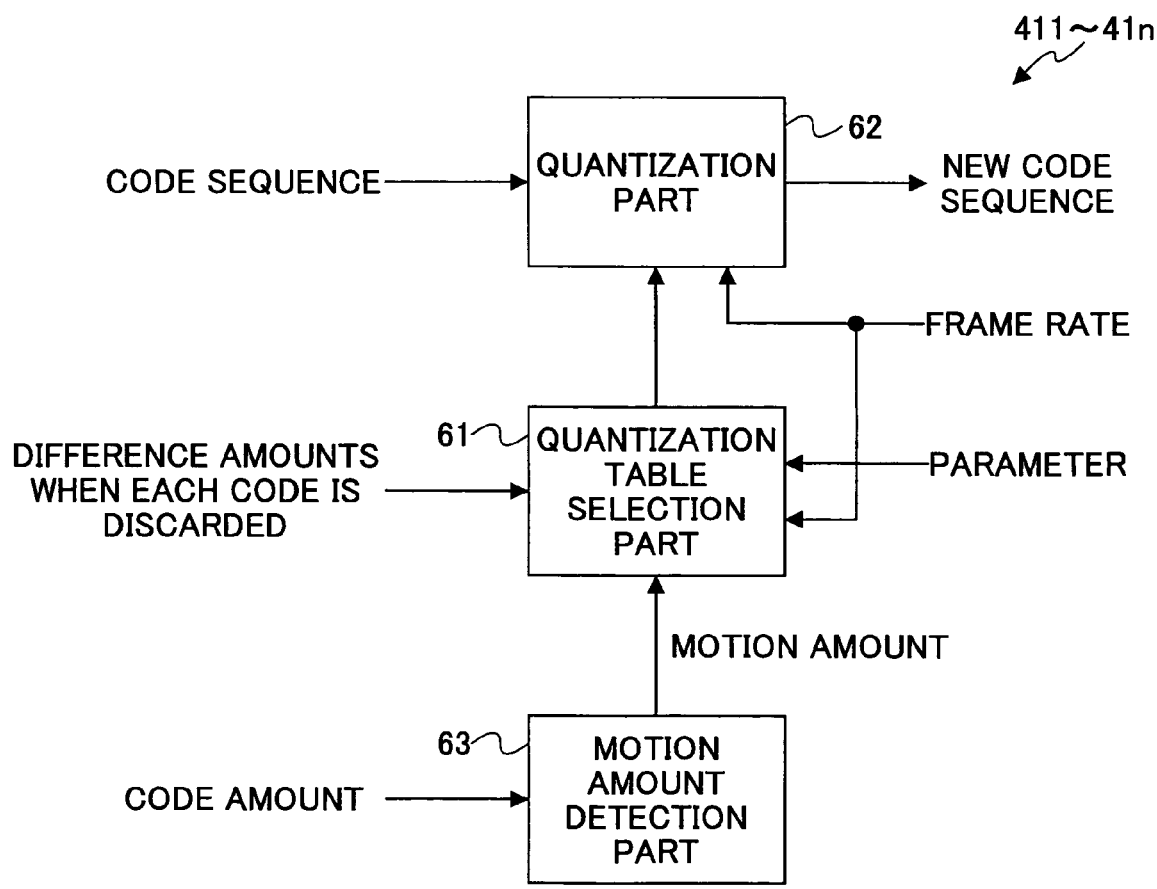
FIG. 19 shows an example of a quantization table group.
FIG. 20 shows a functional block diagram of another configuration example of the code sequence generation unit.

The quantization table includes the number of quantization bits (amount of bits to be discarded) for each wavelet transform coefficient as shown in FIG. 17. FIG. 18 shows an example of wavelet transform coefficients. As shown in FIG. 19, the quantization table is stored as one table in a quantization table group in which a plurality of quantization tables are associated with indexes. The index indicates the order of visual deterioration, and the quantization table includes numbers of quantization bits. As mentioned before, the quantization table selection unit 61 selects a quantization table such that the difference amount corresponding to the quantization table becomes the difference amount indicated by the parameter.

The load is determined according to the number of the code sequence generation units, which are operating, and the parameter generated by the parameter generation unit 46 is determined according to the load. For example, if it is assumed that the number is measured on a scale from 1 to 5 stages, in which stage 5 indicates the greatest number of the operating code sequence generation units, that is, the stage 5 indicates the process load of the code sequence generation units is the greatest, the parameter can be determined such that the stage corresponds to the parameter. Generally, since the relationship between the visual deterioration index and the difference amount is a monotonously increasing relationship, it is easy to select a quantization table by which the calculated difference amount corresponding to the quantization table becomes a difference amount indicated by the parameter. As for the quantization table, generally, the quantization is performed by placing more emphasis on lower frequency components than higher frequency components such that the visual deterioration is inconspicuous. Note that the meaning of the parameter is different between the previously described embodiment and this embodiment.

FIG. 20 shows a functional block diagram of another configuration example of the code sequence generation unit (each of the code sequence generation units 411-41n). Header information of the code sequence stored in the buffer 41 is analyzed by the syntax analysis unit 42. Each difference amount between original code sequence data and newly generated code sequence data in which code(s) is partially discarded from the original code sequence data is obtained from the header information. Then, each difference amount is input in the quantization table selection unit 61. A motion amount detection unit 63 detects the amount of motion of the moving image on the basis of code amount of each wavelet transform coefficient analyzed by the syntax analysis unit 42. The quantization table selection unit 61 selects a quantization table according to the input difference amounts, a frame rate specified by the client 2, the amount of motion detected by the motion amount detection unit 63 and the parameter. The frame rate can be sent from the client to the server in this embodiment. The quantization table selection unit 61 sends the selected quantization table to the quantization unit 62. The quantization unit 62 partially discards codes from the code sequence data according to the data of the quantization table and the frame rate specified by the client 2, and rewrites the header so as to generate new code sequence data.

For selecting a table from a plurality of quantization tables, a method similar to the above-mentioned method can be used. In addition, in this embodiment, the quantization table selection unit 61 stores a plurality of quantization table groups each including quantization tables. A proper table group is selected according to the motion amount and the specified frame rate.

Figure 21A:
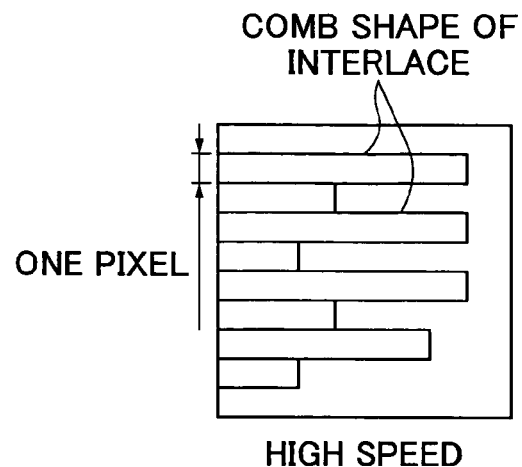
FIGS. 21A-C are figures for illustrating comb shape of interlace.
Figure 21B:
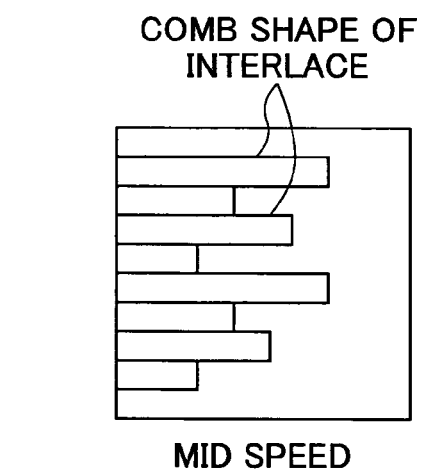
Figure 21C:
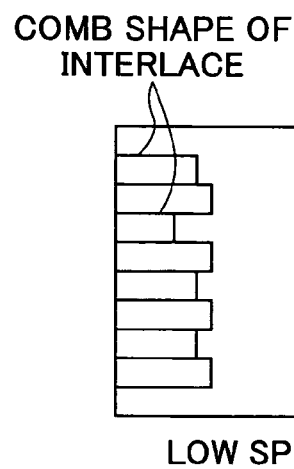

The motion amount detection unit 63 detects the motion amount in the following way. FIGS. 21A-21C are figures to illustrate the concept of the motion amount of a moving image in the Motion JPEG2000. As shown in FIG. 21A, as to an interlace image, long horizontal edges appear in an image in which objects move fast (called to be comb shape of interlace). On the other hand, as for a low speed image, short horizontal edges appear as shown in FIG. 21C. FIG. 21B shows the interlace image for a mid speed image. These differences largely appear in the 1LH component that indicates horizontal edge amount of high frequency component. That is, the absolute value of the coefficient of the 1LH component is large when the motion amount is large. As a result, code amount of the 1LH component becomes large. When the motion amount is determined only by the code amount of the 1LH component, there is a possibility in that the threshold may change according to subject image. Thus, the code amount of the 1LH component is normalized by using the code amount of the 1HL component, and the normalized value can be used as a characteristic value of detected motion amount of the image.

The before-mentioned characteristics largely appear for code amount before discarding bit planes (post quantization). Thus, the server can be configured such that code amounts of 1LH and 1HL before discarding bit planes are written in a code and the motion amount is estimated by using the written amounts. This configuration is especially effective when the compression ratio of the image is large.

Figure 22:
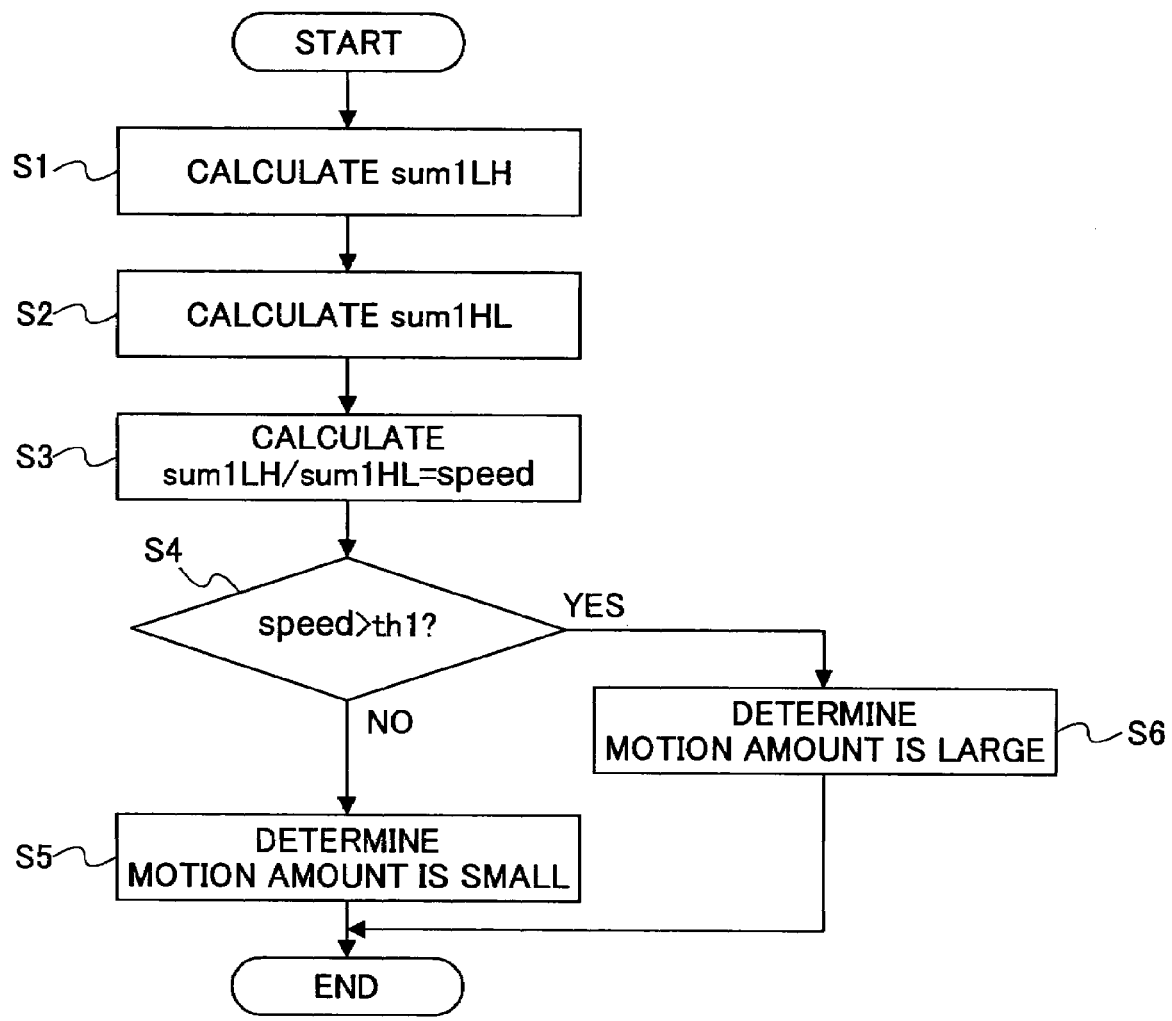
FIG. 22 is a flowchart showing an example for determining the motion amount.

FIG. 22 is a flowchart showing an example process for determining the motion amount of images in this case.

As shown in FIG. 22, first, the sum of loss less code amounts of 1LH (sum 1LH) is calculated in step S1. Then, the sum of loss less code amounts of 1HL (sum 1HL) is calculated in step S2. After that, sum1LH is divided by sum1HL to obtain speed in step S3. The result (speed) is compared with a predetermined threshold (th1). If the speed is greater than th 1(Y in step S3), it is determined that the motion amount of the image is large in step S6. If the speed is equal to or smaller than th 1(N in step S3), it is determined that the motion amount is small in step S5.

For high speed image, by performing quantization such that the before-mentioned comb shape remains, the visual deterioration can be suppressed. However, when frame rate is lowered by thinning out frames, one frame is displayed for a longer time. As a result, the comb shape becomes conspicuous. Therefore, when lowering the frame rate, it is necessary to perform quantization such that the comb shape does not remain even for high speed image. The combination is shown in FIG. 23. That is, when the frame rate is high, quantization is performed such that the comb shape remains when the motion amount is large, but quantization is performed such that the comb shape does not remain when the motion amount is small. When the frame rate is low, quantization is performed such that the comb shape does not remain irrespective of the motion amount. That is, according to the frame rate and the motion amount (speed), a proper quantization table group is selected.

Figure 24:
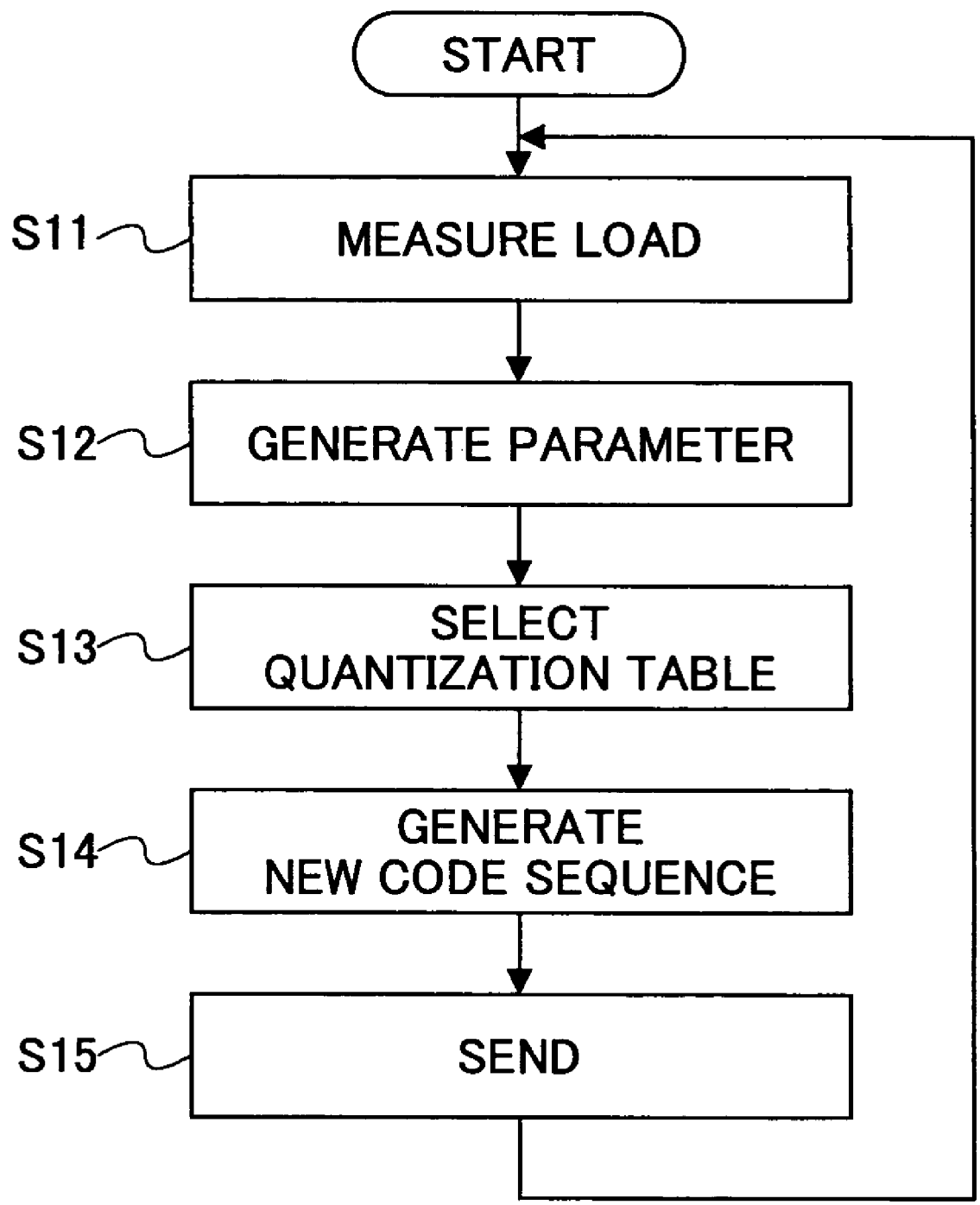
FIG. 24 shows a flowchart of the operation of a server according to an embodiment.

FIG. 24 shows a flowchart of the operation of the server 1. First, the load measurement unit 45 measures the load of the code sequence generation unit 43 in step S11. Then, the parameter generation unit 46 generates a parameter that indicates a difference amount of data amount between the original code sequence data and the new code sequence data to be generated in step S12. The quantization table selection unit 61 selects a quantization table according to the parameter (and frame rate and motion amount) in step S13. After that, the code sequence generation units generate new code sequence data according to the quantization table in step S14, so that the generated code sequence data are sent in step S15.

According to this embodiment, when the load of the server 1 increases as the number of connected clients increases, the parameter that indicates the difference amount is increased, so that the data amount that is sent to the clients can be decreased by the difference amount. That is, the scalability can be dynamically changed according to the load of the server 1. In addition, according to the method using the motion amount, the scalability can be dynamically changed according to not only the load but also the frame rate and the image motion amount, so that deterioration of the moving image can be avoided.

In the following, yet another embodiment of the present invention is described. Differences from the previously described embodiment are mainly described in the following.

Figure 25:
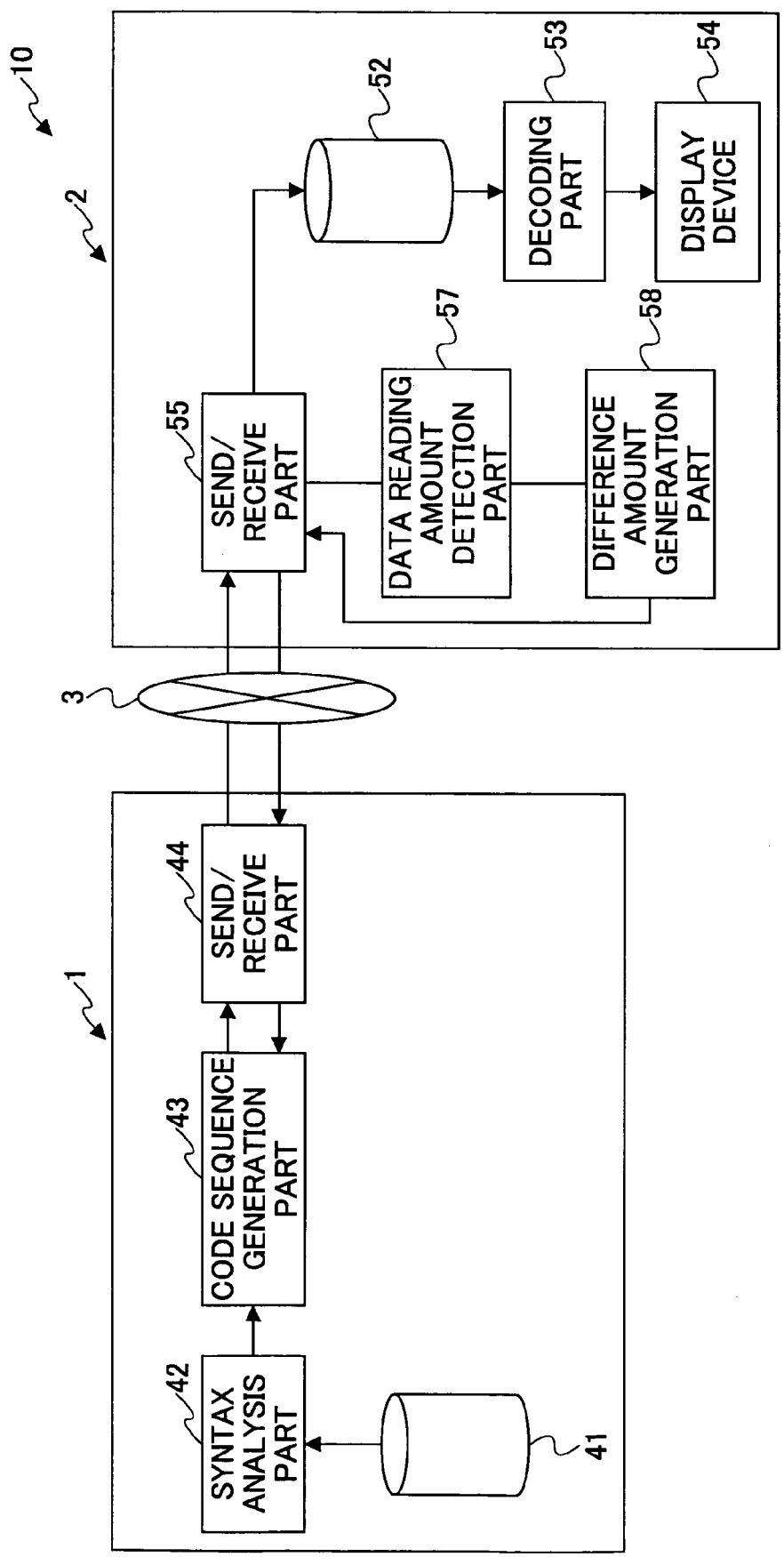
FIG. 25 shows a configuration of a network system of an embodiment.

FIG. 25 shows a configuration of a network system 10 of one embodiment. Compared with the previously described embodiment, the server 1 does not include the parameter generation unit 46 and the load measurement unit 45. Each client 2 includes data reading amount detection unit 57 and a difference amount generation unit 58 that are not included in the client of the previously described embodiment.

The data reading amount detection unit 57 detects an amount of code sequence data read by the send and receive unit 55, so that the client determines whether the traffic of the network 3 is congested or not. The difference amount generation unit 58 determines a parameter (corresponding to the parameter of the previously described embodiment) for the server to generate code sequence data according to the read data amount. The client sends the parameter to the server 1 via the send and receive unit 55.

For example, the difference amount generation unit 58 determines traffic state of the network 3 in stages (1-5, for example, in the same way as the previously described embodiment) according to the data read amount. If the difference amount generation unit 58 determines that the traffic is congested (stage is 5, for example), the difference amount generation unit 58 outputs a large difference amount corresponding to the stage 5.

The code sequence generation unit 43 generates new code sequence data according to the parameter in the same way as each code sequence generation unit described in the previous embodiment. That is, the code sequence generation unit 43 includes the quantization unit 61 and the quantization table selection unit 62. The parameter and difference amounts obtained according to the syntax analysis are input into the quantization table selection unit 62 as shown in FIG. 15. The selection method of the quantization table is similar to that in the previously described embodiment. In addition, the method using the frame rate and the motion amount described with reference to FIGS. 20-23 can be also applied to this embodiment.

Figure 26:
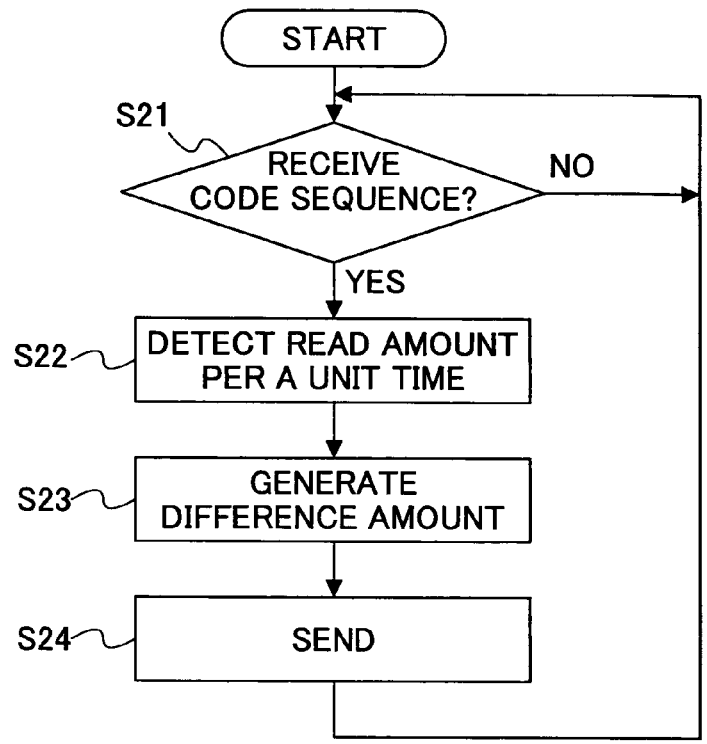
FIG. 26 shows a flowchart showing the operation of the client according to an embodiment.

FIG. 26 shows a flowchart showing the operation of the client. When the client 2 receives code sequence data from the server 1 (Y in step S21), the data reading amount detection unit 57 detects the reading amount of the code sequence data per a unit time in step S22. Then, the difference amount generation unit 58 generates a parameter corresponding to a difference amount corresponding to the detected data amount in step S23. Then, the client 2 sends the parameter to the server 1 in step S24.

Figure 27:
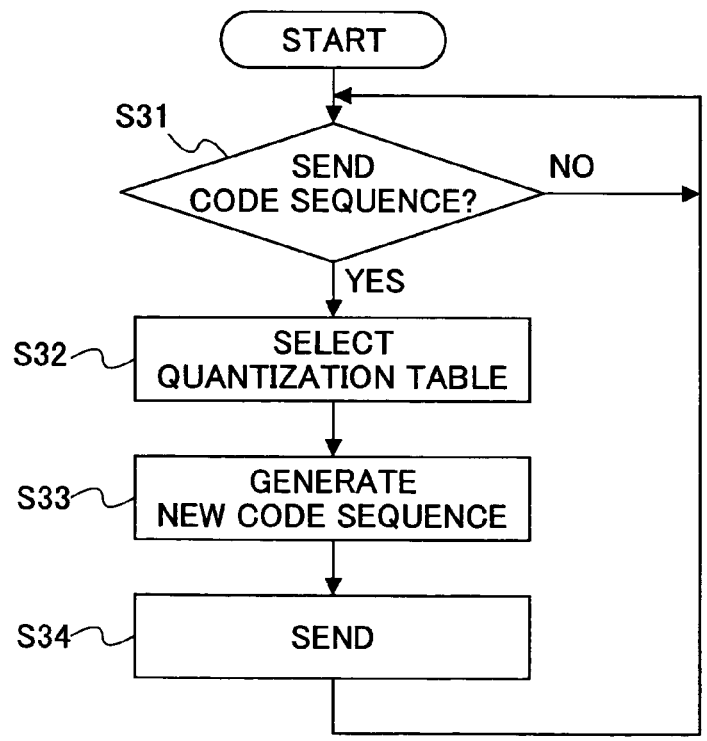
FIG. 27 shows a flowchart showing the operation of a server according to an embodiment.

FIG. 27 shows a flowchart showing the operation of the server 1. When there are code sequence data to be sent (Y in step S31), the server 1 selects a quantization table according to the parameter received from the client (and frame rate and image motion amount in the case shown in FIG. 20) in step S32. Then, the server generates new code sequence data according to the quantization table in step S33. After that, the server sends the generated code sequence data to the client in step S34.

According to this embodiment, when the traffic of the network 3 increases, the parameter that indicates the difference amount is increased, so that the data amount that is sent to the clients can be decreased. That is, the scalability can be dynamically changed according to the traffic of the network 3. In addition, according to the example using the motion amount, the scalability can be dynamically changed according to not only the traffic but also the frame rate and the image motion amount, so that deterioration of the moving image can be avoided.

In the last two embodiments, the difference amount may be any value, for example, the difference amount can be represented by a ratio of decreased amount to the original sequence data amount, or by the number of bits that is decreased, or the like.

The present invention is not limited to the specifically disclosed embodiments, and variations and modifications may be made without departing from the scope of the present invention.

What is claimed is:

1. An image sending apparatus, comprising:
   a syntax analysis unit to analyze syntax of code sequence data, wherein the code sequence data is obtained by dividing moving image data into one or more small regions for each frame and performing hierarchical compression coding on each small region;
   a code sequence generation unit to generate another code sequence data from the code sequence data by using the analysis result by the syntax analysis unit;
   a load measurement unit to measure the load of the code sequence generation unit;
   a parameter generation unit to generate a parameter corresponding to the load; and
   a sending unit to send the another code sequence data;
   wherein the code sequence generation unit generates the another code sequence data by using the parameter such that the data amount of the another code sequence data to be sent per a unit time is adjusted according to the load.

2. The image sending apparatus as claimed in claim 1, wherein the parameter is a parameter for determining image resolution or frame rate or image quantization level.

3. The image sending apparatus as claimed in claim 1, wherein the code sequence generation unit includes a plurality of code sequence generation units, and the load corresponds to the number of the code sequence generation units that are operating in parallel.

4. An image sending system, comprising an image sending apparatus and one or more image receiving apparatuses, the image sending apparatus comprising:
   a syntax analysis unit to analyze syntax of code sequence data, wherein the code sequence data is obtained by dividing moving image data into one or more small regions for each frame and performing hierarchical compression coding on each small region;
   a code sequence generation unit to generate another code sequence data from the code sequence data by using the analysis result by the syntax analysis unit;
   a load measurement unit to measure the load of the code sequence generation unit;
   a parameter generation unit to generate a parameter corresponding to the load; and
   a sending unit to send the another code sequence data to the one or more image receiving apparatuses;

wherein the code sequence generation unit generates the another code sequence data by using the parameter such that the data amount of the another code sequence data to be sent per a unit time is adjusted according to the load;

the image receiving apparatus comprising:

a receiving unit to receive the another code sequence data from the image sending apparatus;

a decoding unit to decode the another code sequence data to moving image data; and a display unit to display the moving image data.

5. The image sending system as claimed in claim 4, wherein the parameter is a parameter for determining image resolution or frame rate or image quantization level.

6. The image sending system as claimed in claim 4, wherein the code sequence generation unit includes a plurality of code sequence generation units, and the load corresponds to the number of the code sequence generation units that are operating in parallel.

7. A computer readable medium storing program code for causing an image sending apparatus to perform processes, the computer readable medium comprising:

syntax analysis program code means for analyzing syntax of code sequence data, wherein the code sequence data is obtained by dividing moving image data into one or more small regions for each frame and performing hierarchical compression coding on each small region;

code sequence generation program code means for generating another code sequence data from the code sequence data by using the analysis result by the syntax analysis program code means;

load measurement program code means for measuring the load of the code sequence generation program code means;

parameter generation program code means for generating a parameter corresponding to the load;

sending program code means for sending the another code sequence data;

wherein the code sequence generation program code means generates the another code sequence data using the parameter such that the data amount of the another code sequence data to be sent per a unit time is adjusted according to the load.

* * * * *